US008175375B2

(12) United States Patent
Bonnery et al.

(10) Patent No.: US 8,175,375 B2
(45) Date of Patent: May 8, 2012

(54) METHOD OF COMPRESSION OF VIDEO TELEPHONY IMAGES

(75) Inventors: Christophe Bonnery, La Digne d'Aval (FR); Jean-Yves Desbree, Villebon sur Yvette (FR); Chrisophe Flouzat, Pierrefitte sur Seine (FR); Daniel Le Guennec, Thorigne Flouillard (FR); David Mercier, Le Mans (FR); Mickaël Remingol, Langueux (FR); Renaud Seguier, Acigne (FR); David Thomas, Nice (FR); Gilles Vaucher, Chantepie (FR)

(73) Assignee: Texas Instruments Incorporated, Dallas, TX (US)

( * ) Notice: Subject to any disclaimer, the term of this patent is extended or adjusted under 35 U.S.C. 154(b) by 1881 days.

(21) Appl. No.: 10/334,825

(22) Filed: Dec. 29, 2002

(65) Prior Publication Data

US 2003/0227539 A1     Dec. 11, 2003

(30) Foreign Application Priority Data

Dec. 28, 2001   (EP) .................................... 01403391

(51) Int. Cl.
*G06K 9/62* (2006.01)

(52) U.S. Cl. ........ 382/155; 382/156; 382/157; 382/158; 382/159; 382/160

(58) Field of Classification Search .......... 382/155–160, 382/165, 170, 224–228
See application file for complete search history.

(56) References Cited

OTHER PUBLICATIONS

Li-an Tang et al. "Characterizing Smiles in the context of video phone data compression", I.E.E.E. Pattern Recognition 1996, pp. 659-663 vol. 3.*
"A Model Problem in the Representation of Digital Image Sequences," Pattern Recognition, Pergamon Press Inc., Elmsford, NY, US, vol. 26, No. 1, 1993, pp. 63-73, XP0003554945; ISSN: 0031-3203; (Kirby M. et al.).
"Generalizations of Principal Component Analysis. Optimization Problems, and Neural Networks," Neural Networks, Elsevier Science Publishers, Barking, GB, vol. 8, No. 4, 1995, pp. 549-562, XP004008601, ISSN: 0893-6080; (Karhunen J. et al.).
"Neural Model for Karhunen-Loeve Transform with Application to Adaptive Image Compression," IEE Proceedings I. Solid-State & Electron Devices, Institution of Electrical Engineers, Stevenage, GB, vol. 140, No. 2, Part 1, XP000382982; ISSN: 0956-3776; (Abbas H. M. et al).
"Low-Dimensional Procedure for the Characterization of Human Faces," Journal of the Optical Society of America—A, Optical Society of America, Washington, US, vol. 4, No. 3, Mar. 1, 1987, pp. 519-524, XP000522491; ISSN: 0740-3232.

* cited by examiner

*Primary Examiner* — Brian Le
(74) *Attorney, Agent, or Firm* — Ronald O. Neerings; Wade James Brady, III; Frederick J. Telecky, Jr.

(57) ABSTRACT

A method of compression of videotelephony images characterized by: creating (10) a learning base containing images; centering the learning base about zero; determining component images by principal component analysis (12); and keeping a number of significant principal components (14).

56 Claims, 14 Drawing Sheets

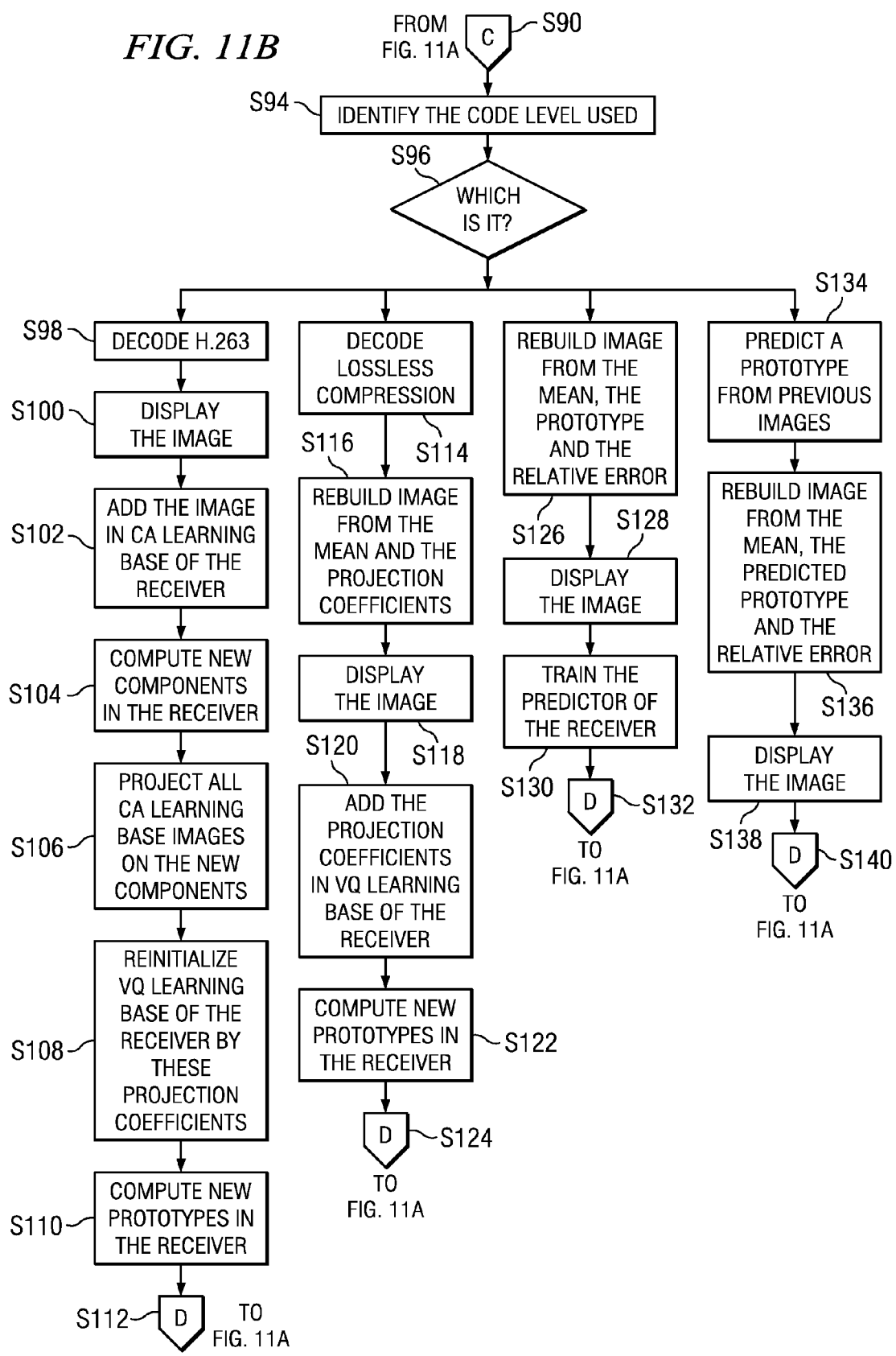

DISTRIBUTION OF THE COEFFICIENTS FOR VARIOUS SEQUENCES IN PCA

METHOD OF COMPRESSION OF VIDEO TELEPHONY IMAGES

BACKGROUND OF THE INVENTION

1. Technical Field of the Invention

The present invention refers to videotelephony and more particularly to image compression for videotelephony.

2. Description of Related Art

At present, transferring live video streams throughout public networks remain a wager.

A good compromise between quality and rate is difficult to reach. For applications such as videotelephony, subjective quality is sensitive to the fluidity of the video stream. At a rate below 20 pictures per second, the feeling of discontinuity is awkward, essentially concerning the movement of the lips.

In the field of videotelephony an important problem is that the sound and the image emitted from a speaker reach a listener with a correct relative timing.

Principal components analysis on the image, principal components analysis in compression, and independent components analysis on the image are known in the prior art.

As well in videoconference as in television duplexes it is easy to observe that there are often problems of synchronization and fluidity. Indeed the images and sound are coded differently and sent independently.

U.S. Pat. No. 5,907,351 discloses a method and apparatus for cross-modal predictive coding for talking head sequences. According to this disclosure the audio signal is constantly transmitted to the receiver and is also used to create a predicted image of the lips of the talking head.

The actual lip image is compared to the predicted lip image. Based upon this comparison, it is determined which of three signals is to be transmitted to the receiver: no signal corresponding to the video signal, a signal corresponding to the video signal, a signal corresponding only to the difference between the actual lip image and a predicted lip image, or the actual lip image.

The receiver reconstructs a lip image based upon the audio signal received and the signal received, if any, corresponding to the video image, and inserts it into the previously received video frame or modifies the previous frame accordingly.

Up to now, the synchronization is not under control and in the case of videoconference, the passband limitations forbid a sufficiently rapid refreshment in order to obtain an appearance of fluidity of the system.

Starting from the principle that the whole of the image does not need a rapid refreshment and a good synchronization, but only some main areas such as the mouth or the eyes, the applicant had the idea to find compression methods which would be much more preferred and specialized for such areas and to model said areas.

The improvement of the compression of this zone of the image makes it possible to reduce the desynchronization between this zone and the sound, and thus to increase fluidity.

SUMMARY OF THE INVENTION

Accordingly, a first subject matter of the invention is a method of compression of videotelephony images, characterized by the steps of:
  creating a learning base containing images;
  centering the learning base about zero;
  determining component images by components analysis;
  keeping a number of significant components.
  According to further characteristics:
  said components analysis for determining component images is principal component analysis
  said components analysis for determining component images is independent components analysis.
  for determining the principal components one searches by calculation eigenvalues and eigenvectors of the covariance matrix of the images of the learning base;
  the kept components are the eigenvectors associated to the found greatest eigenvalues;
  the number of the kept principal components being N, said components are the N eigenvectors associated to the N found greatest eigenvalues;
  if only m<N first principal components are significant, i.e. associated to non zero eigenvalues, the N−m last components are all put to zero;
  it further comprises the step of applying to said principal components the independent components analysis in order to find independent components;
  said components are rendered available for emission and for reception of videotelephony signals;
  it further comprises, upon emission, a step of encoding of an image by centering the data and calculating the projection coefficients of the image, with each of said components, by means of a scalar product; and
  it further comprises, upon reception, the step of calculating a linear combination of components by using as weights the received projection coefficients established upon emission, associated to the considered components and then establishing the average of the components and displaying the obtained image.

The invention further refers to a method of image compression comprising the steps of establishing a learning base containing images to be transmitted, calculating component images by principal components analysis and independent components analysis and using said images for carrying out a video sequence encoding for transmission thereof.

The invention also refers to a method of image compression comprising the steps of establishing a learning base containing images to be received, calculating the component images by principal components analysis and independent components analysis and using said images for carrying out a video sequence encoding for reconstituting during a step of receiving.

The method of PCA calculation involves the search of eigenvalues and eigenvectors of the covariance matrix of the learning base. The N retained components are the N eigenvectors associated to the N greatest eigenvalues found.

Said components must be available in the transmitter and in the receiver.

During the working step, the transmitter carries out the encoding of an image by centering the image, then the projection coefficients of said centered image with each component (by establishing a simple scalar product).

The receiver calculates a linear combination of the components by using as weighting members the received projection coefficients associated to the considered components, and then adds the centering vector.

The image obtained in this way is then displayed.

The components are normed in order to avoid taking into account an additional multiplying factor upon projection.

The interest of the independent components analysis is that in counterpart of an increase of calculations for finding the components, the quantity of information present in the independent components is more homogeneously distributed than in the principal components, which allows to the system to be statistically more resistant to transmission errors on one of the coefficients and more adapted for mouth classification.

According to other features:
- a second vector quantization learning base containing example vectors is created, each example vector being represented by the projection coefficients of each example of the first learning base on the components determined by components analysis, and a set of at least one image prototype is defined based on at least the second learning base;
- a maximum number of prototypes in the set of prototypes and a prototype distance threshold are preset, and the set of prototypes is defined by using a searching algorithm, in which a prototype is defined by a vector in the space of the example vectors of the second learning base, said searching algorithm comprises at least an initialization step, consisting in initializing at least one prototype in view of the example vectors, and a searching step, consisting in, when the number of prototypes is smaller than said maximum number of prototypes and when there is at least one of the example vectors, whose distance to any of the prototypes is greater than said prototype distance threshold, dividing at least one of the prototypes, having a distance to each of the example vectors greater than said prototype distance threshold, into two new prototypes according to the direction of greatest variance of said prototype in view of the example vectors, and replacing the original prototype by the two divided new prototypes in the set of prototypes, and a positioning step consisting in moving the new divided prototypes in view of example vectors according to the algorithm of aggregation around mobile centers, the searching step followed by the positioning step being repeated until for each example vector, it exists at least one prototype having a distance to said example vector smaller than said prototype distance threshold, or until the number of prototypes, is equal to said maximum number of prototypes;
- said prototype distance is the infinite distance;
- said two divided new prototypes are defined as a function of the interval of value of the projections of the examples vector on said direction of greatest variance of said prototype in view of the example vectors;
- said two divided new prototypes are defined as being at one third and two thirds of the interval of value of the projections of the examples vector on said direction of greatest variance of said prototype in view of the example vectors;
- in the initialization step the prototypes are initialized with the prototype being the center of gravity of the example vectors;
- a step of encoding an image by selecting the prototype of the set of prototypes having the smallest distance to said image and sending a code of the selected prototype is provided;
- each prototype is associated with a label forming a code of said prototype;
- a code of the selected prototype with the relative error between the selected prototype and the image coded according components analysis is sent;
- the prototype distance threshold is a power of two;
- at least the last selected prototype is sent to an input of a trainable predictor for predicting a prototype, which is encoded;
- the predictor comprises a trainable neural network;
- the trainable neural network comprises a trainable perceptron;
- the predictor comprises, for each of its outputs a sigmoid function applied to a linear combination of its inputs, wherein the multiplication weights of the linear combinations being trained;
- time delays are inserted in the perceptron;
- the predictor comprises a radial basis function neural network and, for predicting a prototype, the coefficients projections of the image according components analysis are applied to the input of the radial basis function neural network, having a first layer, in which distances between the input and weight vectors calculated based on the set of prototypes are computed, said computed distances being used to compute, by an activation function, outputs of the first layer, and a second layer, having the function of a perceptron applied to the outputs of the first layer, the outputs of the second layer serving to produce a predicted prototype;
- time delays are inserted in the second layer of the predictor;
- the predictor has one reliance value output for each prototype of the set of prototypes, and if the prototype with the highest reliance value corresponds to the selected prototype, one indicates an information that the prediction is right;
- the predictor has one reliance value output for each prototype of the set of prototypes, the prototypes are arranged in the order of their reliance values, and if the selected prototype does not correspond to the prototype with the highest reliance value but corresponds to one of the prototypes having the n next highest reliance values, the image is coded as the place of the selected prototype among said n sorted prototypes having the n next highest reliance values, wherein n is-smaller than the maximum number of prototypes;
- a code of the predicted prototype with the relative error between the predicted prototype and the image coded according components analysis is sent.

A second subject matter of the invention is a method of construction and working out of a dynamic base, such as the learning base used for image compression by means of principal component analysis and independent component analysis, in order to adapt, during compression, the components to the sequence to be compressed.

In the prior art, the adaptation to the compressed images is not performed during the compression.

Only the choice at the beginning of a base of examples, the components of which will allow the best reconstruction possible of the first images of the sequence, allows a small adaptation.

This supposes long acquisition steps in order to generate the bases of examples.

Now, it is impossible to warrant the exhaustive character of the examples, unless having performed acquisitions during a long time and having a very important number of examples.

Thus, it is probable that even with a judicious selection of the base, several images will not be compressed with a satisfactory rebuilding quality.

In order to solve this problem, the object of the invention is to construct and to dynamically work a base of examples.

Accordingly, the invention refers to a method of construction and working out of at least one dynamic base of examples in order to adapt during compression the components to a sequence to be compressed, characterized in that the dynamic base of examples is initialised and a first series of components is calculated from said base;
- when a new image must be compressed, by the method based upon the PCA and ICA, the quality of the image which will be reconstructed is estimated;

if the quality of said image is satisfactory, the base is not modified if the quality is not sufficient, the image is added to the base of examples and the components are calculated again.

According to further features of the invention:

images are added to the base of examples as long as the number of examples in the base of examples is less than a maximal number;

when the maximal number of images is reached, a new image is substituted for another one already contained in said base of examples;

the image to be replaced is the image which is the less correlated with the new image;

it further uses a fixed base having N components calculated through a preprocessing, and the compression of an image is carried out simultaneously by using precalculated components of the fixed base and the components obtained from the dynamic base;

upon encoding, if the error between a reconstructed image and the real image is beyond a determined threshold, the image of the difference is added to the dynamic base and the principal components analysis PCA and then possibly the independent components analysis ICA are calculated again on said base;

when a new image is to be encoded, one estimates the quality of the image which will be reconstructed by an adaptive method, if the quality of the image is sufficient, the adaptive encoding is used, and if the quality of the image is too bad, one adds the image to the base and one calculates again the component allowing an adaptive encoding.

The dynamic base is initialized and a first series of components is calculated from said base.

When a new image must be compressed, one estimates the quality of the image which will be reconstructed by the method based upon the PCA and ICA.

If this quality is satisfactory, the base is not modified.

If the quality is not sufficient, the image is added to the base of examples and the components are calculated again.

Then, these new components will be used.

The use of a dynamic base with the encoder, and upon the calculation of the components at each modification of said dynamic base permits a progressive adaptation to the images to be compressed, but raises the problem of the components synchronization between the transmitter and the receiver.

Once, the image has been added in the base of examples of the transmitter and the components have been calculated again, there is an incompatibility between the components present in the transmitter and those present in the receiver.

It cannot be contemplated to transmit the base in its totality to the receiver.

The goal is to have the same base of images on the transmitter and the receiver.

Accordingly, a third subject matter of the invention is a method of transmission of an image between a transmitter and a receiver, each using image components analysis with at least a first dynamic learning base of examples for an adaptive encoding of the image, wherein when an image is to be encoded, it is estimated either that the transmitter uses the adaptive encoding of the image, or that it uses another encoding implying the updating of said at least first learning base of examples of at least the transmitter with said image.

According to further features of the invention:

the image is encoded in the transmitter according to the first coding type, in which a first code comprising the projection coefficients of the image with each of a number of images components determined by components analysis using the first dynamic learning base of examples is calculated, wherein a first coding type error is calculated based on the first code and on the original image, wherein it is estimated, in a first estimation step based on the calculated first coding type error, either that, in a case of agreement, the image has to be encoded for the transmission at least according to a coding type using at least the first code based on the current dynamic learning base, or, in a case of disagreement, that the image has to be encoded for the transmission according to a coding type which does not use the first coding type and which implies said updating of at least the first dynamic learning base with the image;

in the agreement case of the first estimation step, the first code is encoded according to a second coding type, in which a second code comprising an image prototype selected according to a vector quantization applied to said first code is calculated, a second coding type error is calculated based on the second code and on the first code, it is estimated, in a second estimation step based on the calculated second coding type error, either that, in a case of agreement, the image has to be encoded for the transmission at least according to a coding type using at least the second code, or, in a case of disagreement, that the image has to be encoded for the transmission according to a coding type which does not use the second coding type and which uses the first code;

the second coding type uses a second dynamic learning base of at least the transmitter, for generating a set of image prototypes based on the projection coefficients of the examples of the first learning base, wherein in the case of agreement of the first estimation step, the second code is calculated based on the current second learning base, and, in the case of disagreement of the first and second estimation steps, the second dynamic learning base is updated with the first code and the set of image prototypes is regenerated based on the updated second dynamic learning base;

the agreement case of the second estimation step, the second code is used in a predictor of at least the transmitter to produce a predicted image prototype used in a third code, a third coding type error is calculated based on the predicted prototype and on the second code, it is estimated, in a third estimation step based on the calculated third coding type error, either that, in a case of agreement, the image has to be encoded for the transmission according to a coding type using at least the predicted image prototype, or, in a case of disagreement, that the image has to be encoded for the transmission according to a coding type which does not use the predicted image and which uses the second code;

the predictor is trainable and is trained with at least the second code;

the predictor is trainable and is trained with the first code and the second code;

the image is encoded according to a plurality of coding types comprising at least the first coding type, in which a first code comprising the projection coefficients of the image with each of a number of images components determined by components analysis using the first dynamic learning base of examples is calculated, and another coding type, which uses a generic non adaptive method;

wherein for each code of the original image generated by each coding type, an associated coding type error is calculated based on the original image and said generated code, and a code of the image is selected among the generated codes in view of the associated calculated coding type errors, for the transmission, wherein the first dynamic learning base is updated with the image, if the first code of said image is selected;

the plurality of coding types comprise a second coding type, in which a second code comprising an image prototype selected according to a vector quantization applied to said first code is calculated, the second coding type uses a second dynamic learning base for generating a set of image prototypes based on the projection coefficients of the examples of the first learning base, wherein if the first code of the image is selected, the second dynamic learning base is updated with the first code and the set of image prototypes is regenerated based on the updated second dynamic learning base;

the plurality of coding types comprise a third coding type, in which the first or second code is used in a predictor to produce a predicted image prototype used in a third code, wherein the predictor is trainable and is trained with at least the second code, if the second code of the image is selected;

the predictor is trainable and is trained with the first code and the second code;

if the third code of the image is selected, the predicted prototype and a third coding type error calculated based on the predicted prototype and on the second code are used for the transmission;

a label is associated to each image prototype, the label associated to the selected image prototype of the second code is used for the transmission in case of selection of the second code;

the component analysis used in the adaptive encoding is independent components analysis;

the component analysis used in the adaptive encoding is principal components analysis;

in the case where the transmitter uses another encoding implying the updating of said at least first learning base of examples with said image, encoding of the corresponding image is carried out according to a generic non adaptive encoding;

the updating of said at least first learning base of examples with said image is operated with the degraded image decoded from the code of the image;

the elements necessary for the adaptive encoding are calculated again simultaneously in the transmitter and in the receiver;

in the receiver, when it is estimated that the transmitter uses said other encoding, the received code is decoded according to its coding type, in order to form an image which is displayed, and the first learning base of examples of the receiver is updated based on the received code of the image;

the receiver has the same second learning base as the transmitter, and, when it is estimated in the receiver that the transmitter uses the first code or said other encoding, the received code is decoded according to its coding type, in order to form an image which is displayed in the receiver, and the second learning base of the receiver is updated based on the received code of the image;

the receiver has a predictor similar to the predictor of the transmitter, and when it is estimated in the receiver that the transmitter uses the second code, the received code is decoded according to its coding type, in order to form an image which is displayed in the receiver, and the predictor of the receiver is trained with the received second code of the image;

the set of at least one image prototype is defined based on the first learning base and on images transmitted since the last components calculation of components analysis.

Another way to improve the fluidity in videotelephony is to display at least the most mobile parts of the images, such as the eyes and the mouth, with fluidity. In the case of videotelephony, the most observed areas of the image are the interlocutor's eyes and mouth for which good quality and good fluidity are important. The labial reading on the interlocutor's image influences the understood sounds. The confusion of speech when visual information in the mouth area is known under the term "Mc Gurk effect".

So if one intends to display at least the mouth area with fluidity, the visual comfort of the viewer would be remarkably improved. Furthermore, the improvement of the remainder of the face in the image can be omitted for sparing the quantity of data to be transmitted from the transmitter to the receiver as well as the bandwidth needed for the transmission.

For that purpose, a fourth subject matter of the invention is a method of following a deformable object in acquired images.

Matthew Turk and Alex Pentland, Massachusetts Institute of Technology "Eigenfaces for Recognition" The journal of Cognitive Neuroscience, 1991, volume 3, number 1, pages 71-86, disclose a near real-time computer that can locate and track a subject's head, and then recognize the person by comparing characteristics of the face to those of known individuals.

The computational approach taken in this system is motivated by both physiology and information theory as well as by the practical requirements of near-real-time performance and accuracy.

This approach treats the face recognition problem as an intrinsically two-dimensional recognition problem rather than requiring recovery of three-dimensional geometry taking advantage of the fact that faces are normally upright and thus may be described by a small set of 2-D characteristic views.

The system functions by projecting face images onto a feature space that spans the significant variations among known face images.

The significant features are known as "eigenfaces" because they are the eigenvectors (principal components) of the set of faces; they do not necessarily correspond to features such as eyes, ears and noses.

The projection operation characterizes an individual face by a vector of projection coefficients, and so to recognize a particular face it is necessary only to compare these vectors to those of known individuals.

This method provides the ability to learn and later recognize new faces in a supervised manner and it is easy to implement using a neural network architecture.

The purpose of the invention is to show how one can do that by transferring only a few additional data.

The studied algorithm is based on the Principal Components Analysis PCA.

It is assumed that:

only one person is talking in front of the camera;

the detection of the presence of the face is supposed to be done in order to have an approximation of its location and size. This can be carried out by an ellipse sensor.

Once the mouth is localized, it is possible to hardly compress it with a relatively good quality.

Tests on the developed algorithm have raised some problems that led the applicant to work on localization and tracking.

Once the localization of the mouth is approximately known by means of a face sensor one can localize it precisely and then track it.

The method in its basic form allows a good reconstitution of the mouth on the condition that one works with the same person for making a database.

It is one object of the invention to improve this method in order to get a good reconstitution with anybody.

A fourth subject matter of the invention refers to a new method of following a deformable object in acquired images, comprising:
  carrying out a principal components analysis of the object, with taking into account the images acquired up to a time t;
  using first eigenvectors provided by the PCA;
  defining at a time t+1 one zone in the image wherein the presence of the object will be evaluated, said zone being centered on the mouth detected at time t (3, FIG. 4).
  projecting the object onto said first eigenvectors in order to evaluate at the time t+1 a projection error signal between the projected zone wherein the object is expected to be found at the time t+1 and the same reconstructed zone;
  using a search technique in the region of search around the location of the object detected at time t (2, FIG. 4) of the most probable zone in the image at the time t+1 with taking into account the projection error signal; and
  defining the most probable zone where the object is located in the image at the time t+1, in the sense of the projection error.

According to further features of the invention:
said projection is carried out only onto a few eigenvectors;
the size of the image is reduced in order to speed up the calculation;
it further comprises a step of applying a rapid search algorithm in the image area;
said search algorithm is the orthogonal search algorithm.

This method allows the progressive learning of the shape of the object to be followed and is independent of said object.

In particular, it is possible to follow an eye, a mouth, a nose or a face.

It is particularly adapted to deformable objects such as the mouth or the eyes.

BRIEF DESCRIPTION OF THE DRAWINGS

The invention will be further described with reference to drawings wherein:

FIG. 11A and FIG. 11B show the receiver flow diagram, whatever embodiment for the transmitter is chosen;

DETAILED DESCRIPTION OF THE INVENTION

Figure 1:
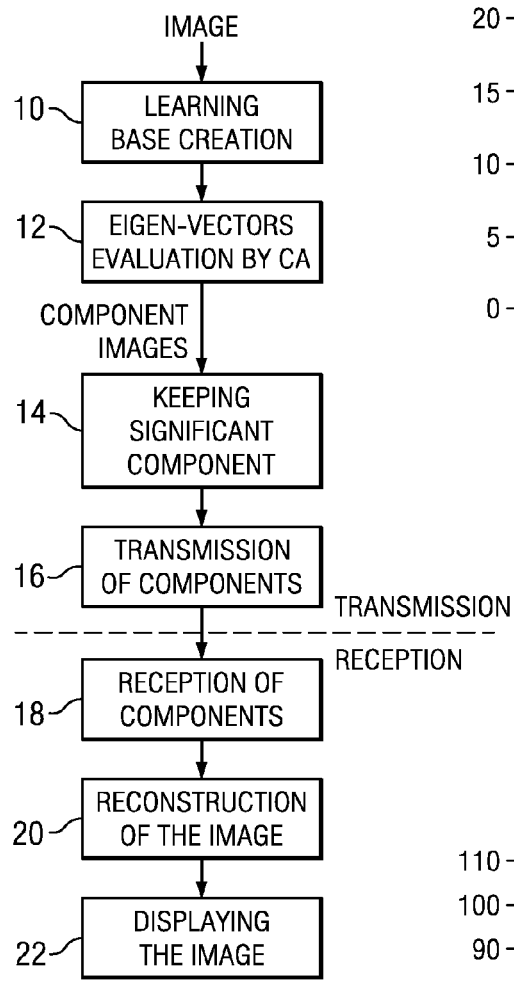
FIG. 1 is a flow chart of a system for carrying out the method of compression of videotelephony images of the invention.

A system for carrying out the method of compression of videotelephony images according to the invention is shown by the flow chart of FIG. 1.

Further it is understood that such a system can be implemented by any kind of digital computer-based hardware.

According to the flow chart of FIG. 1, upon transmission at the transmitter, a learning base is created at step 10.

Then at step 12 components evaluation by components analysis is carried out.

The image components are then processed and at step 14 the significant components are kept.

At last at step 16, the kept components are transmitted to the receiver.

The components are received at step 18, at step 20 the image is reconstructed and at step 22 the reconstructed image is displayed.

There are two ways to conceive the construction of images, and there are two ways to consider the data.

The data are a series of images, each image being a series of pixels.

In the following, one notes $P_{ij}$, the value of the $i^{th}$ pixel of the $j^{th}$ image, N (for example N=3648) the number of pixels, and M the number of images in a block.

Architecture 1.

In a first architecture, one has considered that a realization (or one individual, one observation) is the set of values taken by the same pixel in the different images. The variables are hence the images.

The data matrix is the following matrix:

$$D_1 = \begin{bmatrix} p_{1,1} & \cdots & p_{N,1} \\ \vdots & & \vdots \\ p_{1,M} & \cdots & p_{N,M} \end{bmatrix} \begin{array}{l} \text{1 variable} \\ = \text{1 image} \end{array}$$

1 realization
= 1 observation
= 1 individual

The expectation of the realizations $E_1(R)$ is then defined by:

$$E_1(R) = \frac{1}{N}\sum_{i=1}^{N} R_i = \frac{1}{N}\begin{pmatrix} \sum_{i=1}^{N} p_{i,1} \\ \vdots \\ \sum_{i=1}^{N} p_{i,M} \end{pmatrix}$$

It is the average of the realizations. It is a vector composed of the average of each image.

This average value is used for centering the data.

One subtracts $E_1(R)$ from each column of $D_1$ for obtaining $D_{c1}$.

The data covariance is then:

$$cov(D_{c1}) = \frac{1}{N}D_{c1} \cdot D_{c1}^T = \left(\left(\frac{1}{N}\sum_{l=1}^{N} P_{l,i} \cdot p_{l,j}\right)\right)_{i,j}$$

It is a M×M matrix which corresponds to the correlations between the variables, i.e. between the images.

This first architecture is the most used in ICA. In exploitation to center one image, one uses its average and sends it with projection coefficients.

Architecture 2.

In a second architecture, one has considered that a realization (or an individual, an observation) is an image.

Accordingly, the variables are pixels.

The matrix of data is the following matrix:

$$D_2 = \begin{bmatrix} p_{1,1} & \cdots & p_{1,M} \\ \vdots & & \vdots \\ p_{N,1} & \cdots & p_{N,M} \end{bmatrix} \begin{array}{l} \text{1 variable} \\ = \text{1 pixel} \end{array}$$

1 realization
= 1 observation
= 1 individual
= 1 image

The expectation of the realizations $E_2(R)$ is then defined by:

$$E_2(R) = \frac{1}{M}\sum_{i=1}^{M} R_i = \frac{1}{M}\begin{pmatrix} \sum_{i=1}^{M} p_{1,i} \\ \vdots \\ \sum_{i=1}^{M} p_{N,i} \end{pmatrix}$$

It is the average of the realizations. It is a vector composed of the average of each pixel and which forms an average image.

This average value is used for centering the data.

One subtracts $E_2(R)$ from each column of $D_2$ for obtaining $D_{c2}$.

The covariance of the centered data is then:

$$cov(D_{c2}) = \frac{1}{M}D_{c2} \cdot D_{c2}^T = \left(\left(\frac{1}{M}\sum_{l=1}^{N} P_{i,l} \cdot p_{j,l}\right)\right)_{i,j}$$

It is a N×N matrix which corresponds to the correlations between the variables, i.e. between the pixels.

This second architecture is the most used in PCA. In exploitation one centers an image, thanks to the average data vector.

The principal component analysis PCA will now be presented.

The PCA belongs to the group of multidirectional descriptive methods called factorial methods.

Here the main interest of PCA which is to propose from a rectangular table of data including values of p quantitative variables for n units, geometric representations of said unities is diverted.

Thus, one can determine groups among the units and see if the variables are correlated.

It is merely desired to hold the first main vectors found by the PCA in order to use them as a base. For each image, it is sufficient to calculate the projections on said base vectors and to transmit them.

The transmitted information quantity is then very small.

The geometrical interpretation of the PCA is as follows.

Let the data be considered as being measurements carried out on M units $(u_1, u_2, \ldots u_m)$ (here M images taken at different moments). The N quantitative variables which represent said measurements are $(x_1, x_2, x_N)$ (the pixels in the present case).

One can represent each unit by the vector of said measurements on the N variables:

$$u =_i^T = [x_{i1}, x_{i2} \ldots x_{iN}]$$

In order to obtain an image of the set of units, one locates oneself into an affine space and one selects as origin the particular vector of $R^N$, for example the null vector. The set of points which represent the units is conventionally called, "cloud of individuals". This space is provided with a distance, which in the case of PCA is the euclidian distance, and with an associated scalar product.

The choice of the null vector as the origin being nonjudicious, one decides to take as new origin the center of gravity of the cloud of individuals so that one operates now upon the vectors:

$$u_{ci}^T = [x_{i1} - x_{m1} \; x_{i2} - x_{m2} \; \ldots \; x_{iN} - x_{mN}]$$

The inertia of said cloud of points can then be defined either with respect to the center of gravity G (Ig), Ig being given by:

$$Ig = \frac{1}{M}\sum_{i=1}^{M} d^2(G, u_i),$$

or with respect to a straight line D crossing G and supported by $v_1$.

$$I_{v1} = \frac{1}{M}\sum_{i=1}^{M} d^2(h_{v1i}, u_i)$$

or more generally a vectorial sub-space V containing G. This inertia is by definition equal to:

$$I_v = \frac{1}{M}\sum_{i=1}^{M} d^2(h_{vi}, u_i)$$

Where $h_{v,i}$ is the orthogonal projection of $u_i$ on the sub-space V.

Let be V* the orthogonal complement of V in $R^N$; then according to the theorem of Huygens: $I_v + I_{v*} = I_G$.

$I_G$ being the inertia of the cloud about its center of gravity.

By projecting the cloud of individuals onto the sub-space V, one looses the inertia measured by $I_v$, one holds only that measured by $I_{v*}$. This inertia which is linked to the dispersion of points, corresponds to the information provided by said dispersion.

The PCA finds the minimal inertia axis since it is the axis which is the closest to the point set of the cloud of individuals.

Consequently, if one must project this cloud onto this axis, it is this axis which will give the least deformed image of the cloud:

Then the minimal inertia axis in the orthogonal is calculated and so on.

By taking the found k first vectors, it is ensured that one has the vectorial sub-space of size k such that the projection of the cloud thereon is as least deformed as possible in the sense of Euclidian information.

For the PCA the data are in the form of a matrix $D_{PCA}$.

The columns are homogeneous relative to what is searched, i.e. it contains an entire signal: a column and consequently a realization, corresponding to the set of measurements on a same sensor.

Thus a line is a variable and contains the different values measured at a same moment on different sensors.

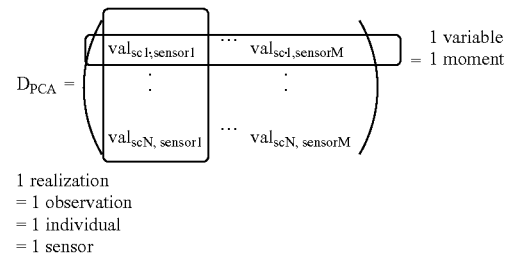

1 realization
= 1 observation
= 1 individual
= 1 sensor

The expectation of the realizations E(R) is defined and is given by:

$$E(R) = \frac{1}{M}\sum_{i=1}^{M} R_i = \frac{1}{M}\begin{pmatrix}\sum_{i=1}^{M} PSc.1 \text{ sensor } I \\ \sum_{i=1}^{M} Psc.N \text{ sensor } I\end{pmatrix}$$

This is an average signal which serves to center the data. One subtracts E(R) from each column of $D_{PCA}$ in order to obtain $D_{PCAc}$, the matrix of centered data for PCA.

The covariance of the centered data is then:

$$cov(D_{PCAc}) = \frac{1}{M} D_{PCAc} \cdot D_{PCAc}^T = \left(\left(\frac{1}{M}\sum_{i=1}^{M} val_{sc.i\,sensor\,i} \cdot val_{scj\,sensor\,j}\right)\right)_{i,j}$$

This is a N×N matrix which corresponds to the correlations between the variables i.e. between the samples.

Then the PCA calculates the eigenvectors of the centered covariance matrix COV ($D_{PCAc}$).

However, it sometimes occurs that the number of lines of $D_{PCAc}$ is more than the number of columns. In such a case many calculations are useless since one operates upon a matrix having dimensions higher than the described vectorial space.

In fact, one calculates the vectors of the kernel of the linear application defined by $D_{PCAc}$ (i.e. vectors associated to the zero eigenvalue).

It may be then judicious to operate upon the dual problem i.e. upon the small dimension by calculating rather the eigenvectors of $D_{PCAc}^T \cdot D_{PCAc}/M$.

One obtains the eigenvectors with non-zero eigenvalues by multiplying those of $D_{PCAc}^T \cdot D_{PCAc}/M$ by $D_{PCAc}$.

Indeed, let be $b_2$ an eigenvector of $D_{PCAc}^T \cdot D_{PCAc}/M$ associated to the eigenvalue $\lambda$.

$$b1 = D_{PCAc} \cdot b2$$

Then, $D_{PCAc} \cdot D_{PCAc}^T \cdot b1/M = D_{PCAc} \cdot D_{PCAc}^T \cdot D_{PCAc} \cdot b2/M = D_{PCAc} \lambda b2 = \lambda b1$.

So b1 is the eigenvalue of $D_{PCAc} \cdot D_{PCAc}^T/M$ and the associated eigenvalue is the same eigenvector $\lambda$.

If B is taken as normed base to be obtained through the PCA, B is deduced from $B_1$ by renorming $B_1$. A direct formula from $B_2$ is $B = B_1 \Lambda^{-1/2} = D_{PCAc} B_2 \Lambda^{-1/2}/\sqrt{M}$ where $\Lambda$ is the matrix containing the eigenvalues on its diagonal.

Then, one checks that $B^T.B = J_d$, wherein $J_d$ is the identity matrix.

$$b_j^T \cdot bi = \lambda_j^{-\frac{1}{2}} \cdot b_{2j}^T \cdot D_{PCAc}^T \cdot D_{PCAc} \cdot b_{2i} \cdot \lambda_i^{-\frac{1}{2}} / M = \lambda_j^{-\frac{1}{2}} \lambda_i \lambda_i^{-\frac{1}{2}} \cdot b_{2j}^T \cdot b_{2i} = \delta_{ji} \Rightarrow B^T \cdot B = J_d$$

The calculations of eigenvalues and normed eigenvectors are carried out by directly using the function "EIG" of MATLAB (for instance).

The independent components analysis ICA which will now be described appeared in 1984 in the form of the problem of source separation.

This problem consists in conceiving a method adapted to retrieve the p unknown sources observed through q unknown mixtures of these p sources.

The q mixtures are obtained by q sensors.

These mixtures may be of two types, i.e. convolutive or linear instantaneous.

The results are then obtained with an approximation of one permutation and respectively with an approximation of one scale factor or convolutive mixture.

Three hypotheses are in general necessary.

a—The sources are mutually independent. This hypothesis is always necessary.

b—For many algorithms, the mixture is assumed to be linear, instantaneous.

c—The sources are not gaussian (or only one).

In order to solve this problem, one uses two principles based upon the hypothesis a.

Either one searches the statistic independence and then one uses:

A function as the Kullback-Leibner divergence or the mutual information which is null if the sources are independent.

The moments and the cumulants which are null at all the orders if the sources are independent.

Or one performs a working of the probability density by the method of the maximum of likelihood.

For the ICA, the data are in the form of a matrix $D_{ICA}$.

The lines are homogeneous relative to what is searched, i.e. in the present case that the matrix contains an entire signal.

One line and hence one variable, corresponds to the set of measurements on a same sensor.

One column is hence one realization and contains the different values measured at a same moment on the different sensors.

$$D_{ICA} = \begin{pmatrix} val_{sc1,sensor1} & \cdots & val_{scN,sensor1} \\ \vdots & & \vdots \\ val_{sc1,sensorM} & \cdots & val_{scN,sensorM} \end{pmatrix} \begin{array}{l} 1 \text{ variable} \\ = 1 \text{ sensor} \end{array}$$

1 realization
= 1 observation
= 1 individual
= 1 moment

The expectation of realizations E(R) is defined by:

$$E(R) = \frac{1}{N}\sum_{i=1}^{N} R_i = \frac{1}{N}\begin{pmatrix} \sum_{i=1}^{N} PSc.Isensor\ 1 \\ \vdots \\ \sum_{i=1}^{M} PSc.Isensor\ M \end{pmatrix}$$

It is the average value of each signal which is useful for centering the data.

E(R) is subtracted from each column of $D_{ICA}$ for obtaining $D_{ICAc}$, the matrix of data centered for ICA.

The covariance of centered data is then:

$$cov(D_{ICAc}) = \frac{1}{N} D_{ICAc} \cdot D_{ICAc}^T = \left[\left[\frac{1}{N}\sum_{i=1}^{M} val_{sci.\ sensor\ i} \cdot val_{sci\ sensor\ j}\right]\right]_{i,j}$$

It is a M×M matrix which corresponds to correlations between the signals received on each sensor.

The ICA is carried out by applying the algorithm of the fixed point of Hyvarinen. The operation needs two steps:

spatial whitening at the order 2 of the observations;

deflation applied to the whitened observations.

The first step consists in whitening the observations. For this purpose the PCA is used.

One attempts to whiten $D_{ICAc}$. To this end one calculates the base of the eigenvectors of COV ($D_{ICAc}$) noted U and the diagonal matrix of the associated eigenvalues (in the same order) $\Lambda$. The whitened observations matrix Y is then given by:

$$Y = \Lambda^{1/2} \cdot U^T \cdot D_{ICAc}$$

It is checked that the data are white by:

$$cov(Y) = \frac{1}{N} Y \cdot Y^T = \frac{1}{N} \Lambda^{-\frac{1}{2}} \cdot U^T \cdot D_{ICAc} \cdot D_{ICAc}^T \cdot U \Lambda^{-\frac{1}{2}} = \Lambda^{-\frac{1}{2}} U^T \cdot \Lambda \cdot U \cdot \Lambda^{-\frac{1}{2}} = I_{dM}.$$

The principle of deflation is to find the source vectors one after the other.

In order to find one vector a criterion $J(w_x^T)$ is optimised with regard to w and under the strain $E[(w^T_x)^2]=1$.

For specific criteria such as the contrast functions, when one has an optimum $w^T$. $D_{ICAc}$ is a source.

The strain $E[(w^T_x)^2]=1$ allows to obtain normed sources.

The contrast functions used by Hyvärinen are in the form $J_g(x)=E[G(x)]-E[G(\sigma_x.v)]$ where $\sigma_x$ is the variance of x and v is the gaussian random variable of variance 1.

Thus $\sigma_x$ is the random gaussian variable of same variance as x.

It will also be noted $C=E\{x.x^T\}$.

For G(u) one can take $u^4$ which gives the kurtoris or non linear functions such as those the derivative of which is g(u)=tanh(u) or $$g(u) = u \cdot \exp \cdot \left(-\frac{1}{2}u^2\right).$$

As soon one has i sources, one calculates the $i+1^{th}$ by applying the same principle but by continually projecting on the space orthogonal to the i sources that one already knows.

In practice for a given W the recurrent relations are:
Evolution through the fixed point:

$$w_k^* = C^{-1}E[x.g(w_{k-1}^T x)] - E[g'(w_{k-1}^T x)]w_{k-1}$$

Normalisation:

$$w_k = \frac{w_k^*}{\sqrt{w_k^{*T} C w_k^*}}$$

For the $p+1^{th}$ projection on the space deprived of the p first w:

$$w_k^{p+1} = w_k^{p+1T} - \sum_{j=1}^{p} w_k^{p+1T} C w_k^j$$

Normalisation:

$$w_k^{p+1} = \frac{w_k^{p+1}}{\sqrt{w_k^{p+1T} C w_k^{p+1}}}$$

At the function output, one obtains the separation matrix and a matrix containing the different sources.

The relations are W.Y=S
From the relations $$Y = \Lambda^{-\frac{1}{2}} \cdot U^T \cdot D_{ICAc} \text{ and } W \cdot Y = S$$

One obtains $$D_{ICAc} = U\Lambda^{-\frac{1}{2}} \cdot W^{-1} \cdot S$$

$$S = W\Lambda^{-\frac{1}{2}} \cdot U^T \cdot D_{ICAc}$$

In the case of PCA followed by ICA, then these equations are simplified and $C=J_d$.

The quality of reconstitution as a function of the architectures and then for each architecture will now be studied and eigenvectors of PCA and ICA will be compared.

There are three series of experimentations.

For ICA, in three cases, it is the whitening which performs the reduction of the vectorial space.

In other words, for whitening the data one keeps the number of vectors of the PCA corresponding to the final number of sources.

Accordingly, for a same architecture, the vectorial space is the same in output of the ICA as in output of the PCA.

So, the reconstructions are here identical for PCA and ICA for a same way of centering the data.

For the three series, the same test base which is a sequence where a speaker pronounces the numbers 0 to 9 has been used.

None of the images of this sequence have been taken in order to form the learning bases.

First Series
The learning base is formed of 240 images representing 3 different persons.
20 eigenvectors are kept.

Second Series.
The learning base is formed of 120 images representing 3 different persons.
10 eigenvectors are kept.

Third Series.
The learning base is formed of 240 images representing 3 different persons.
7 eigenvectors are kept.

In all the cases, the good reconstruction and the problems appear at the same locations.

The parts where the mouth is relatively stable for a certain time are very well reconstructed.

In the learning base, these images are very often represented, hence the associated redundant information has oriented the results of the PCA.

On the contrary, on the transitions, the reverse occurs.

These evanescent sequences did not represent much of the information in the set and consequently there is no correct eigenvectors for them.

The result is that upon a sudden movement of the lips (radical change of shape in less than ten images) one has sometimes the impression of "jumps" in the reconstructed sequence.

It is also noted an evident loss of quality when the number of vectors decreases (occurrence of halftones of more and more important fuzziness during the transitions).

For the two first series, the centering by the average of images according to above described architecture 1 appears to be most efficient.

However, this centering is based upon the images of transition and by selecting the least bad one.

During the moments where the mouth moves little, there are not too many differences.

For the third series, it is the second architecture which gives the more satisfactory results.

As supposed the architecture 1 which centers each image is easier to carry out when different sequences are used and changes of luminosity and contrasts may occur.

It has also been noticed upon carrying out other series of tests that architecture 1 becomes more efficient than above described architecture 2 when the number of learning images is decreased.

However, this is true only if a sufficient number of eigenvectors is used.

When the number is too small, the information given in architecture 2 by the average image of the sequence becomes very important relative to the information linked to the projections. Owing to this average image information, architecture 2 is then more efficient than architecture 1.

It is to be understood that finally, through the properties of dual problems of PCA, the difference between both PCA (and thus ICA) is not linked to the modelisation (factorial code or images) but rather to architecture, i.e. to the way of centering the data. When one looks at the eigenvectors, one can see that all the vectors but one are identical.

In architecture 1, the first vector of the PCA is the average image but all the following vectors are identical to those of the $PCA_2$ (except for the sign which is given here by the video inversions).

One will now examine the differences between PCA and ICA in the field of eigenvectors in the case of architecture 1.

For the ICA, one can in fact determine two eigenbases.

The first one is obtained by reducing the size of the vectorial space upon whitening.

One enters into the deflation 20 white vectors and one outputs therefrom 20 sources.

The described vectorial subspace is strictly the same as the PCA and consequently the reconstruction is identical.

Only the nature of the vectors can render the method interesting.

The second one is obtained by reducing the size upon the deflation.

One enters 60 white vectors into the deflation and one outputs 20 sources.

The vectorial space is not the same and the vectors are very different.

The PCA vectors (FIG. 4) are rather few significative. One recognizes teeth or lips but on a relatively complex background and finally if one would have to construct oneself a mouth with these vectors, it would not appear to be evident.

When ICA is applied to these vectors, the first vectors are immediately more explicit. One sees perfectly and almost uniquely an upper lip for one of the images, the corner of the mouth for the second one.

But about ten vectors hold an inhomogeneous background and would be uneasy to use for the-present application.

When whitening is performed (FIG. 5) in a much more important vectorial space, the eigenimages are simplified some more, and almost all of them are workable by a man in order to reconstruct by hand the mouths without knowing the projection coefficients. One has the "lips tips", one would use as parts of a puzzle.

Figure 6:
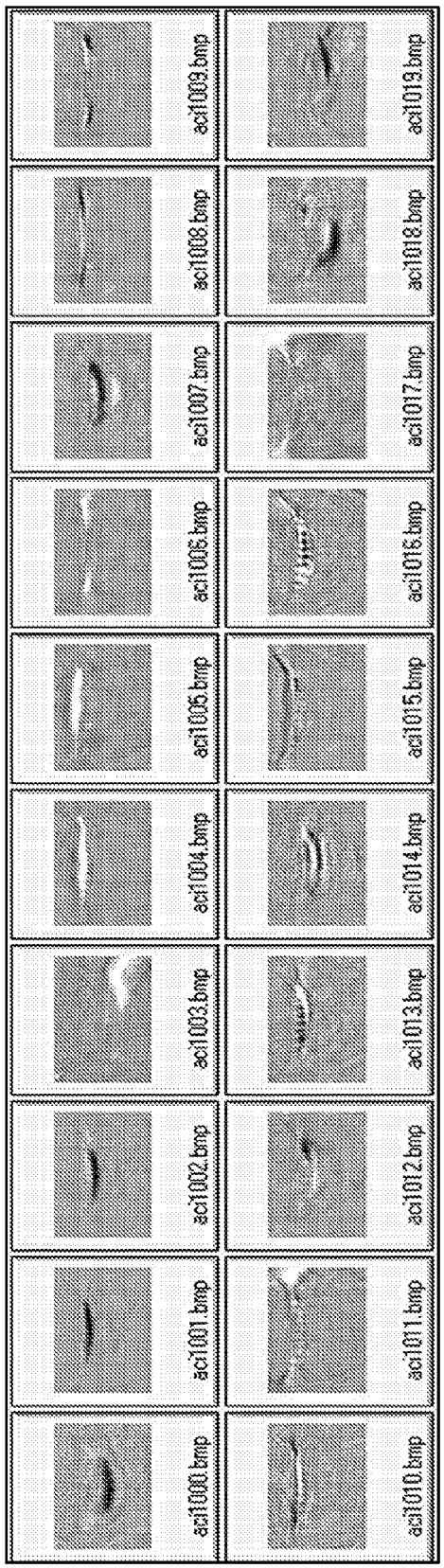
FIG. 6 shows 20 vectors of the ICA with architecture 1 for the first series when the size reduction is performed in the deflation.

The tests show that the most important is the size of the space of whitened data, most is localized the information of the vectors obtained through the deflation (FIG. 6), i.e. the "lips tips" are smaller.

One will now compare the eigenvectors of the PCA and ICA for the architecture 2.

Only the vectors obtained for decrease of the vectorial space upon whitening will be presented here.

The size decreases by means of deflation does not operate (60 vectors instead of 20 are obtained).

Figure 7:
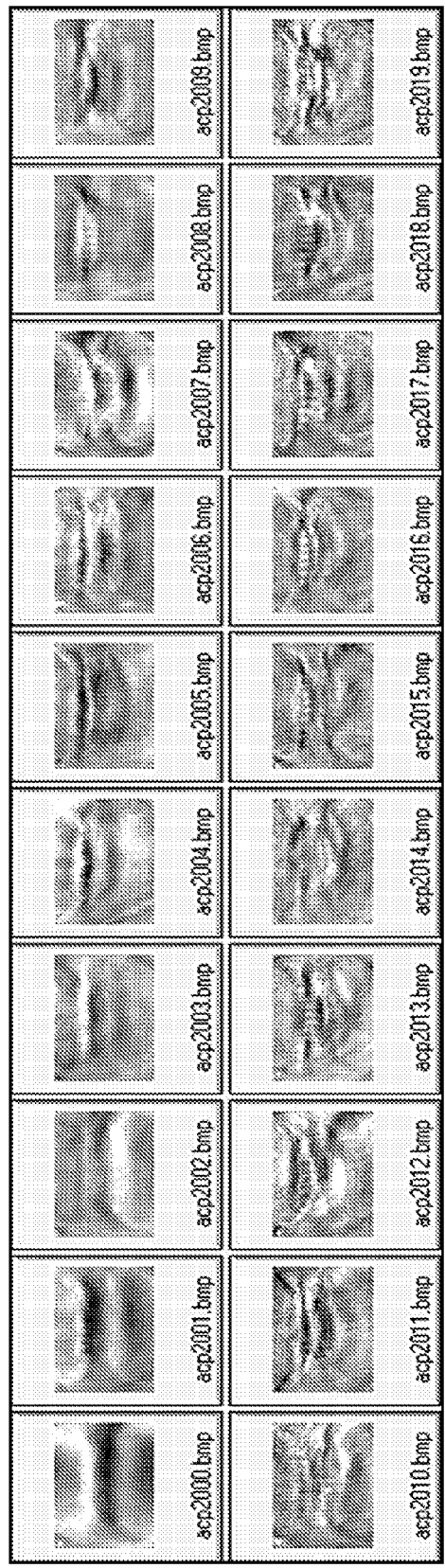
FIG. 7 shows 20 vectors of the PCA with an architecture 2 for the first series.
Figure 8:
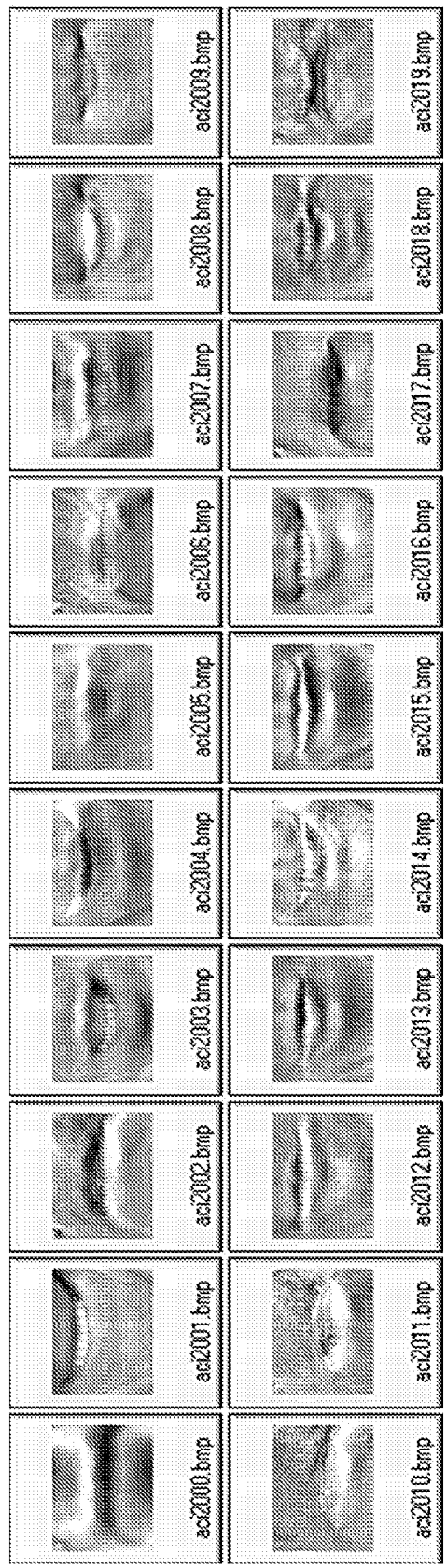
FIG. 8 shows 20 vectors of the ICA with architecture 2 for the first series when the size reduction is performed upon whitening.

The two bases are:
the 20 PCA vectors in architecture 2 for the first series, shown at FIG. 7;
the 20 ICA vectors in architecture 2 for the first series when the size reduction is carried out upon whitening, shown at FIG. 8.

Of course, one has the same problems concerning the ICA (there are the same vectors but 1).

One sees that once passed through the deflation algorithm, the first vector is held but all the others have changed.

One has on the one hand very recognizable images which are almost those of learning base.

It is the case of aci2001 which resembles Z of "zero" and the beginning of numbers "cinq"., "six" and "sept".

Or aci2003, which is the mouth saying "un", aci2005 appears to say "deux" or the beginning of "trois", aci2016 resembles to the end of "huit".

And further, images which would be difficult to be used, but which are much less complex.

There are more images composed of two mouths and three lines of teeth as for acp2011.

In fact, when one looks the result of the ICA eigenvectors; one intuitively sees that upon the reconstructions one will mainly use an image as aci2001 and that the other images will have little influence.

It is convenient with the model which desires that the coefficients be independent.

In fact, the stable positions of the mouth which are very different and give independent images (the sound "s" of aci2001, "un" of aci2003 and "eu" or "oi" of aci2005) will become eigenvectors. Then, when one projects the sequence on the stable positions of the mouth, one of the positions will be substantially 1 and the others will be O.

One would obtain series of independent coefficients.

Accordingly, the less comprehensive images would be the images linked to the transitions, and a little modified in order to ensure the independence of the series of coefficients.

Considering that one reduces the vectorial space upon whitening, one has seen that it is not possible to use the reconstruction in order to differentiate PCA from ICA since the reconstruction is identical for the two analyses.

For a sufficient number of vectors, it is the architecture 1 which appears to be of the best quality and which in the field of the videoconference does not need an average image which is incalculable since it is based upon the future images. Furthermore, it would be necessary to transfer said future images.

In the PCA, the aim is to maximize the information in the vectors. Said vectors are hence mixtures of information available in the learning base.

For retrieving information, it is necessary to have a relatively complex mixture which would be uneasy to obtain intuitively.

Owing to the ICA, independent vectors are obtained.

A basic information is thus contained in one vector.

The intuitive use is then easier.

In the ICA1, one reconstructs the mouth thanks to a piece of lip which is relatively simple and in the ICA2, one easily mixes two or three well understood images.

The reason is that one easily conceives by intuition in which sequence operates a determined vector.

In reality, a vector number classification is carried out very easily.

Finally there are three possible encoding modes.

PCA alone.

The advantage of this first mode is that the image reconstruction can be performed with few eigenvectors and the process if faster.

ICA alone.

When ICA alone is concerned it means ICA without reduction of dimension by PCA. As a matter of fact most of the ICA algorithms carry out PCA as previous processing.

The advantage of this second mode is that the analysis is potentially more pertinent.

PCA for the reduction of the size/whitening and then ICA upon the reduced/whitened data.

The advantage of this third mode is that the image reconstruction is performed with few components and coefficients analysis is potentially interesting.

As a matter of fact PCA+ICA is less complex than ICA alone since one reduces the dimension by means of PCA and for this reason the calculations are more rapid for the ICA.

Differences in the distribution of the components provided from PCA and ICA.

One has defined a criterion allowing to measure the importance of the vectors of projection bases obtained from the PCA and from the ICA.

In so far as the information is distributed in a more concentrated way in the first eigenvectors, the eigenvalues coming from the PCA encoding have a decreasing energy.

Upon the transmission of the PCA coefficients, if an error occurs on one of the first coefficients (the third for example), its impact on the image reconstruction will be more important than when it occurs on a coefficient corresponding to an eigenvector associated to an eigenvalue of low energy (the tenth one for instance).

In the case of the ICA, the importance of the components is more homogeneous.

Figure 2:
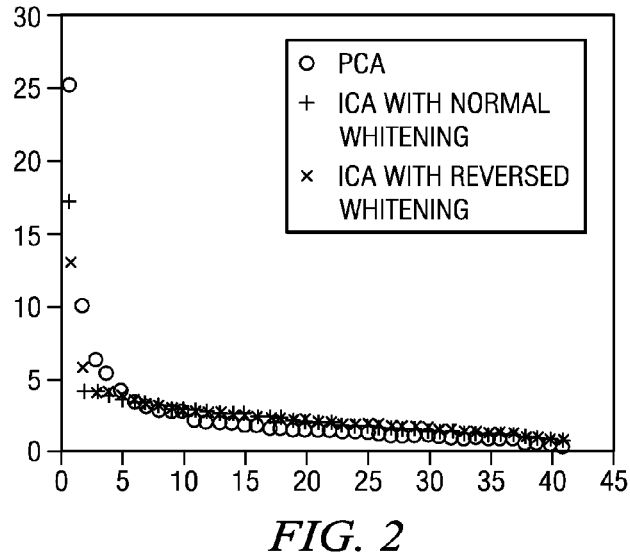
FIG. 2 is a diagram of the coefficients in % for each base as a function of the classifying numeral.
Figure 3:
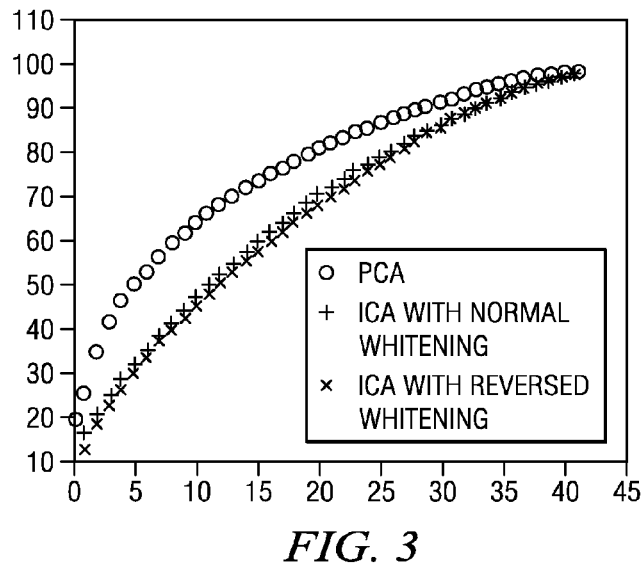
FIG. 3 is a diagram of the cumulated coefficients of FIG. 2.

Thus as shown at FIGS. 2 and 3, the impact in the reconstruction of an error occurring on a coefficient will be substantially of the same spread irrespective of the corrupted coefficient.

One will notice that for the first vectors, the criterion is much more important for the PCA base than for the ICA bases.

Consequently, the cumulated curve of the PCA is above the two ICA curves which are very close from one another.

Then for ten kept vectors a 70% reconstruction is provided by the PCA and a only 45% reconstruction is provided by the ICA.

This would explain the fact that the PCA reconstruction is better than the ICA reconstruction on the condition that the dimensions are not reduced upon whitening for the ICA.

It is to be reminded that the principle of the PCA is to find an orthonormed base of very particular vectors. For any n the vectorial subspace generated by the n first vectors is the n dimension vectorial subspace such that after orthogonal projection, the loss of information in the quadratic sense is smaller.

On the contrary, the principle of the ICA is to find independent components.

There is no problem of quality estimation after reduction of the space. Then one notice that the base vectors of the ICA are almost equitably important i.e. the classifying dynamic is small.

Accordingly when one transmits PCA type coefficients it is suitable to:
more efficiently protect the coefficients associated to the highest eigenvalues;
an error correcting code will be used. For example, a convolutive code, a turbo-code or a block code like of the Reed-Solomon type can be used.
allocate a smaller quantifying pitch to the coefficients associated to the highest eigenvalues comparatively to the quantifying pitch allocated to the other coefficients.

When one transmits the ICA type coefficients it is suitable to:
protect in the same way the projection coefficients, by an error correcting code such as a convolutive code, a turbo-code or a block code like of the Reed-Solomon type;
allocate a quantifying pitch identical for all the coefficients.

Errors often occur and will more and more occur in the form of bursts.

Depending on the size of error bursts and the type of data that said errors corrupt, different protection strategies are implemented.

Errors localised on coefficients.

If coefficients related to high eigenvalues in the case of a PCA transmission are concerned, the reconstructed image will be highly disturbed.

Then one can consider this image as being lost.

If coefficients related to small eigenvalues in the case of a PCA transmission, or to any one of the ICA coefficients are concerned, the image will be only little disturbed.

The intact coefficients allow reconstruction of an image of poor but acceptable quality.

Errors on the whole sent images upon the constitution of the learning base.

Upon constituting the learning base which must be the same upon transmission and receipt, it is important that the receiver and the transmitter have exactly the same images.

If a transmitted image is corrupted, it is necessary to implement a feed-back type process: the receiver realizing that the sent image is corrupted, sends towards the transmitter a signal indicating to the same to transmit the image once more.

Now is described the vector quantization used for the second coding type.

As described above, the first coding type using the first CA learning base comprises the projection of the images on components (eigenvectors or independent components), and then the emission of these projection coefficients from the transmitter to the receiver. For that, each scalar coefficient is quantified, then coded according to a predefined Huffman's table. That implies however the sending of at least N values (where N is the number of kept components) and to have coding tables accepting large dynamics.

Figure 16:
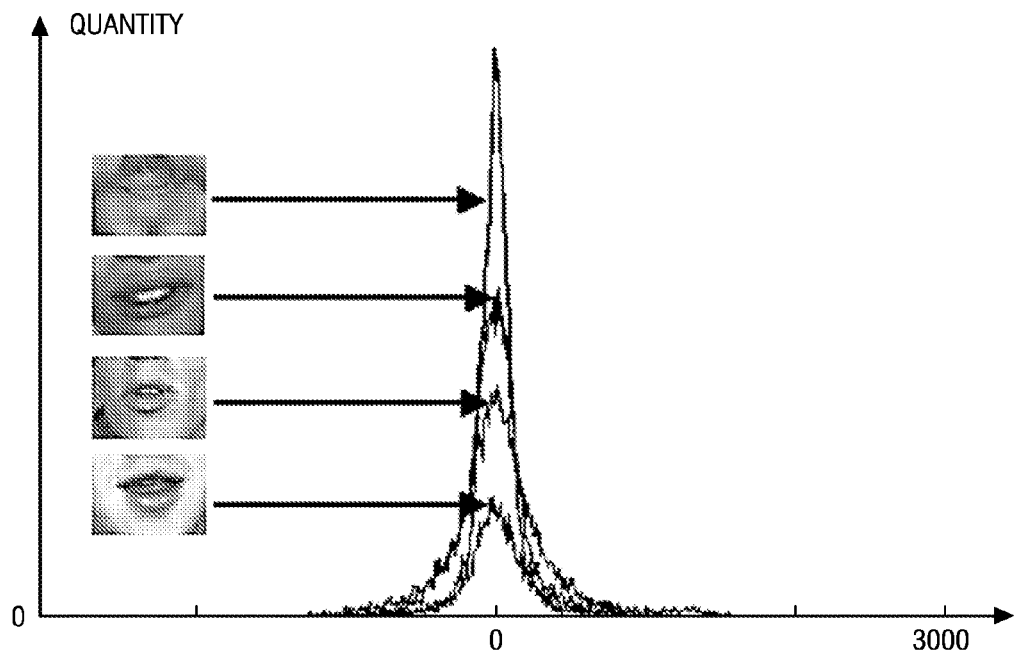
FIG. 16 shows a distribution of the projection coefficients for various sequences in PCA.
Figure 17:
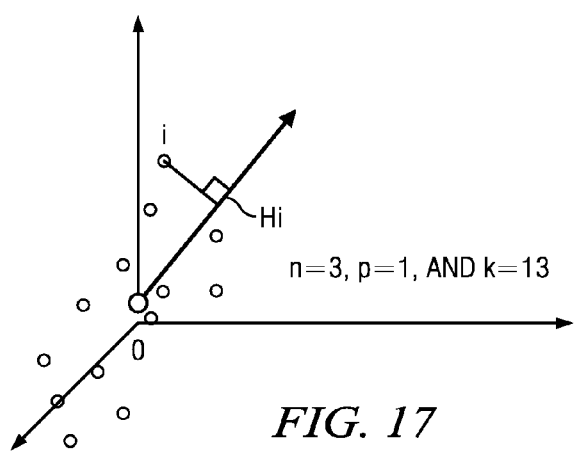
FIG. 17 is a diagram showing a vector describing a set of points forming a cloud of points in the input space, each point representing a particular mouth.
Figure 18:
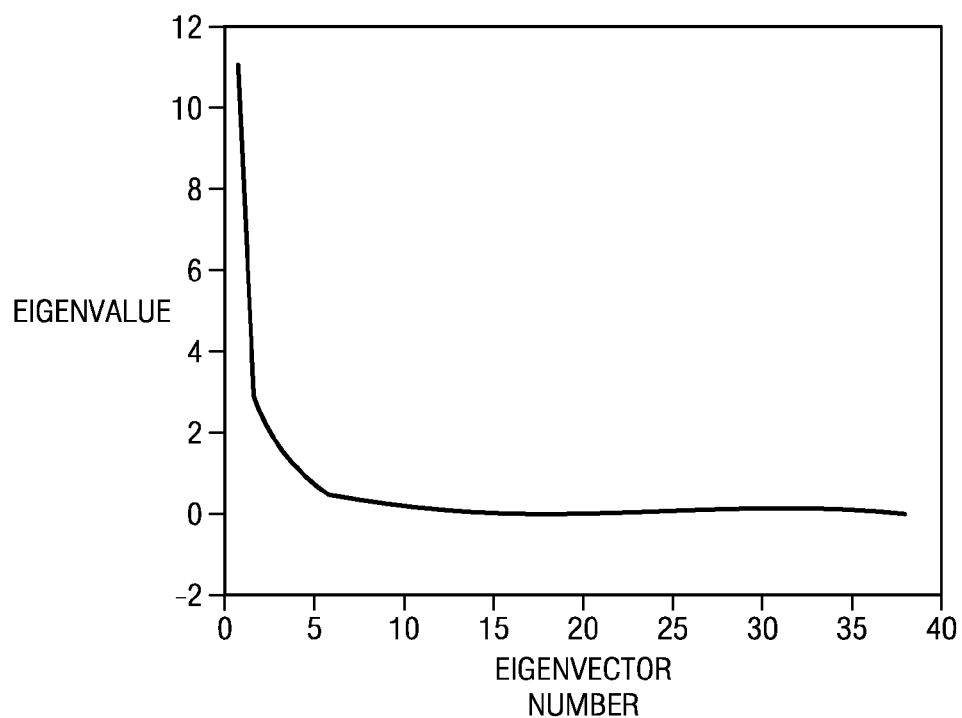
FIG. 18 is a diagram showing the eigenvalues decrease with the number of eigenvectors.
Figure 19:
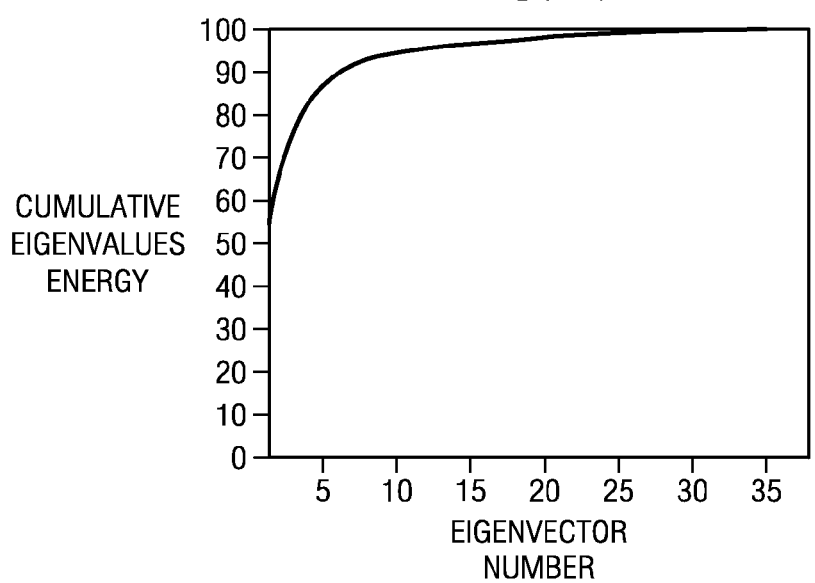
FIG. 19 is a diagram showing the cumulative eigenvalues energy.
Figure 20:
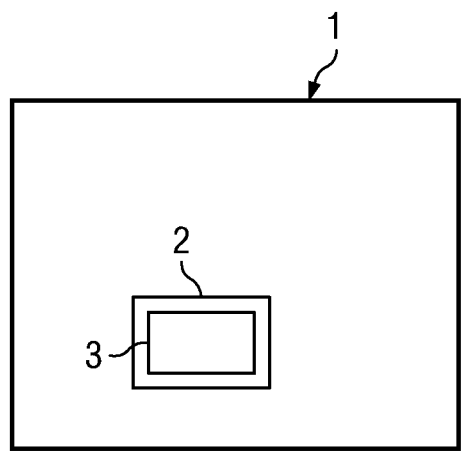
FIG. 20 shows diagrammatically the tracking of a mouth.
Figure 21:
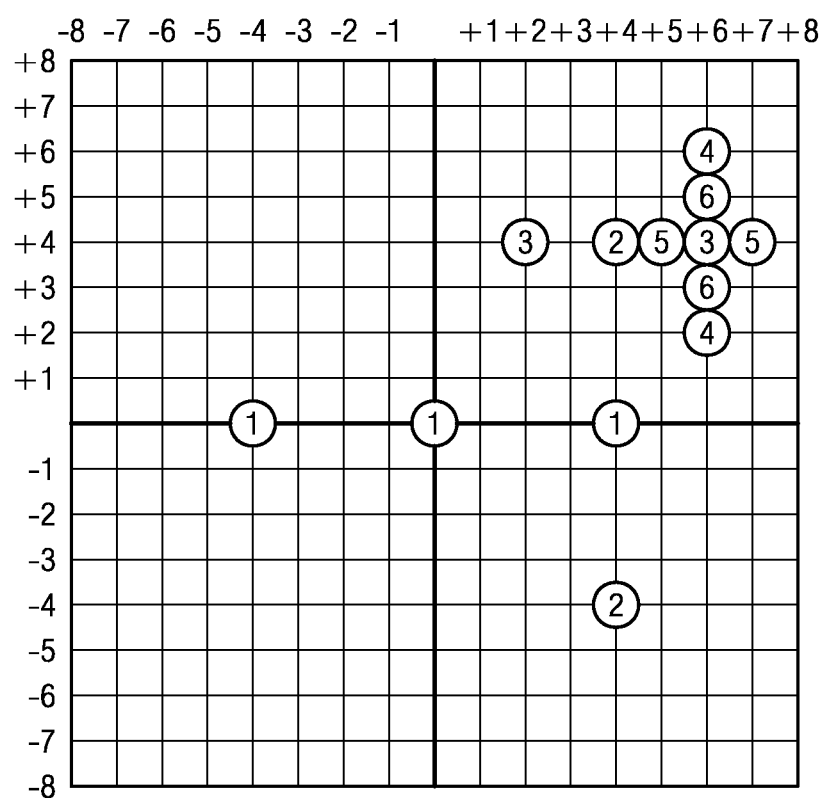
FIG. 21 is a diagram representing the orthogonal search algorithm implemented in the mouth tracking method of the invention.

FIG. 16 shows a distribution of the projection coefficients for various sequences in PCA.

Figure 13:
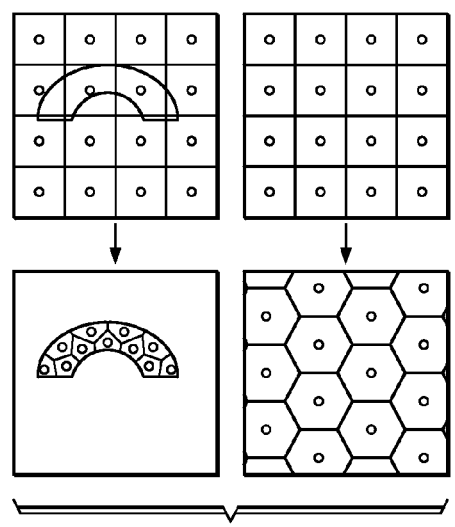
FIG. 13 illustrates the result of vector quantization compared to scalar quantization.

Vector quantization intervenes then. The idea is to define prototypes referred by a label. An economic method is simply to send the label of the prototype nearest to the data to be coded. In fact, the interest is that this method does not generate a regular paving of space, including zones never reached by data, but only maybe irregular paving of zones where the data are. This principle is illustrated on FIG. 13, in which the location of the data is illustrated by grey zones and the location of the prototypes is illustrated by points, with scalar quantization at the top and vector quantization at the bottom, for two different data distribution on the right and on the left.

At the start, when there are few components (for example only five) and as many images in the first learning base, search for example sixteen prototypes does not make any sense.

When there are few images in the first learning base, the components can change strikingly after a recalculation, and so can the prototypes (some can even be unused thereafter).

When there are many images in the first learning base, the components cannot change a lot after a recalculation, and neither can the prototypes. A perfectly deterministic algorithm is needed to guarantee there are the same prototypes both in the transmitter and in the receiver.

There is defined a search algorithm called "soft splitting".

A second learning base for vector quantization (VQ), called second vector quantization learning base is defined. This second learning base contains example vectors. Each example vector is represented by the projection coefficients of each example of the first learning base on the components determined by components analysis and eventually all the images which were sent according to the first coding type since the last computation of the components.

A set of image prototypes, called dictionary, is defined based on the second learning base. The dictionary is initialized with the previous prototypes. If there are not any, the barycentre of the vector examples is used for defining one prototype in an initialization step.

If a prototype is not used any more, it is eliminated.

A maximum number of prototypes in the set of prototypes and a prototype distance threshold are preset. The prototype distance is for example the infinite distance.

The set of prototypes is defined by using a searching algorithm shown on FIG. 14, in which a prototype is represented by a square, the example vectors are represented by a cross and the preset prototype distance threshold is represented by dotted lines. In the example shown on FIG. 14, there are five example vectors, and the preset maximum number of prototypes is three. A prototype is defined by a vector in the space of the example vectors of the second learning base.

A searching step is executed, when it is determined that the number of prototypes is smaller than said maximum number of prototypes and when it is determined that there is at least one of the example vectors, whose distance to any one of the prototypes is greater than said prototype distance threshold. In the searching step, one of the prototypes, which is determined as having a distance to each of the example vectors greater than said prototype distance threshold, is divided into two new prototypes according to the direction of greatest variance of said prototype in view of the example vectors. In the example shown on FIG. 14, part b, this direction of greatest variance is illustrated as the horizontal direction. In the example shown on FIG. 14, part d, this direction of greatest variance is illustrated as the vertical direction.

Then, the original prototype (part b and d in FIG. 14) is replaced by the two divided new prototypes in the set of prototypes.

The two divided new prototypes are defined as a function of the interval of value of the projections of the examples vector on said direction of greatest variance of said prototype in view of the example vectors. For example, as illustrated on parts b and d of FIG. 14, the two divided new prototypes are defined as being at one third and two thirds of the interval of value of the projections of the examples vector on said direction of greatest variance of said prototype in view of the example vectors.

Then a positioning step is executed, in which the new divided prototypes are moved in view of example vectors according to an algorithm of aggregation around mobile centers, also called generalized Lloyd algorithm (GLA). This algorithm enables to move q provisional or temporary centers in view of a set of fixed points in a R-dimension space having a distance. A class is defined for each of the q provisional centers. A partition of the space is formed by the q classes. The classes are delimitated in the space by convex polyhedric partition walls formed by the perpendicular bisector planes of the segments linking all possible couples of provisional centers, i.e. by the planes of equal distance between the two points of all possible couples of provisional centers. This partition is also called Voronoï's partition. There are defined q new centers in view of the q previous centers and of the points (or the q provisional previous centers are moved to the q new centers). Each new center is calculated as being the center of gravity of its associated class. Then the algorithm is applied to the new centers becoming the provisional centers, until the new centers are equal to the previous centers. After each searching step, the algorithm of aggregation around mobile centers or generalized Lloyd algorithm (GLA) is applied to the centers being the prototypes obtained by said searching step, in view of the points being the example vectors.

The prototypes of part b and d in FIG. 14 are moved by the positioning step to a position illustrated in parts c and e on FIG. 14.

The algorithm of aggregation around mobile centers is described in more details in Ludovic Lebart, Alain Morineau, Marie Piron, "Agrégation autour des centres mobiles", Statistique exploratoire multidimensionnelle, pages 148-154, Dunod, Paris 1997, ISBN 2 10 004001 4, 2ème cycle, 2ème edition.

The GLA is described in more details in Mc Queen, Some Methods for classification and analysis of multivariate observations, Proceeding of the fifth Berkeley symposium on mathematicals statistics and probability, Vol 1, p 281-297, University of California Press, Berkeley, 1967, integrated herein by way of reference and in Yoseph Linde, Andrés Buzo, Robert M. Gray, An Algorithm for Vector Quantizer Design, IEEE Transactions on Communications, Vol. Com-28, N°1, January 1980, pages 84 to 95 integrated herein by way of reference.

The searching step followed by the positioning step are repeated until for each example vector, it exists at least one prototype having a distance to said example vector smaller than said prototype distance threshold, or until the number of prototypes is equal to said maximum number of prototypes, the first of these two conditions being met stopping the repetition. Then, the image is encoded by selecting the prototype of the set of prototypes having the smallest distance to said image and sending a code of the selected prototype. For example, each prototype is associated with a label forming a code of said prototype.

Of course, the maximum number of prototypes will determine the size of the words used to code the label. That is the reason why, in order to guarantee a very good ratio code's size/quality, it is judicious to take as number of prototypes a power of 2.

For a better quality, it is then possible to send also the relative error between the prototype and the coded data according to the first coding type. The size of the prototypes guarantees that the dynamics of the errors on each component is much weaker than total dynamics, which thus allows a smaller coding table so a more efficient coding. A profit compared to the scalar quantization can thus be expected. And with the stopping criterion of the "soft splitting" made by comparison with a threshold and the infinite distance, the size of the words for this error is exactly known (it is the size to code the threshold). A power of 2 can thus be judicious as the threshold.

Moreover, the sending of this error can be made in several packages according to error protection: high-order bits and low-order bits of the error for example.

Thus, not only a coding more powerful than the coding type is obtained, but a coding which allows also various levels of quality according to the material, the subscription or the bandwidth available for the user, without increasing the cost in term of calculation, is obtained.

Now is described a third coding type of the image, using a predictor. In a first embodiment of the predictor, at least or only the last selected prototype is sent to an input of a trainable predictor P for predicting a prototype. The predicted prototype is then encoded.

Figure 15:
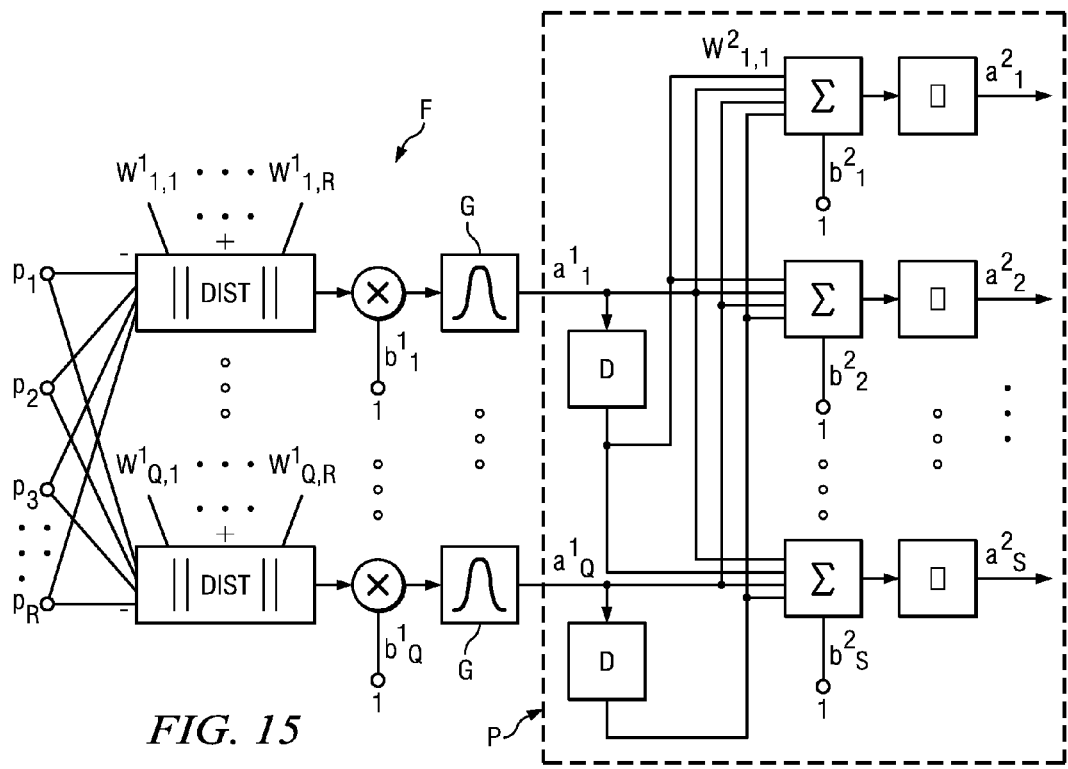
FIG. 15 a neural network used for predicting an image prototype.

The predictor comprises a trainable neural network, which is for example a trainable perceptron P, as shown on FIG. 15 and which has one output for each prototype of the set of prototypes. The last prototype is sent to the predictor in the form of a vector of 0, except at the line associated to the selected prototype corresponding to the label. The label of the selected prototype or the corresponding prototype is converted by adequate means into said input vector for the predictor.

The predictor comprises, for each of its outputs ($a^2$) a sigmoid function (f) applied to a linear combination of its inputs ($a^1$), wherein the multiplication weights ($w^2$) of the linear combinations are trained. The interest of the sigmoid function is to prevent any divergence of the network by dint of learning even if it is defined a high training step such that the network is rapid to learn.

Time delays (D) are inserted in the linear combinations of the inputs ($a^1$) of the predictor.

In a second embodiment of the predictor, for a better efficiency, it is used as inputs the first code of the image, generated by components analysis.

The predictor comprises for example a radial basis function neural network (RBF) which has good training capacities and function approximation efficiency. A RBF is a two-layer neural network. The coefficients projections of the image according components analysis are applied to the inputs of the first layer F of the radial basis function neural network. In the first layer F, distances are computed between the input vector and different weight vectors $W^1$ representing the set of Q prototypes previously determined. Each prototype has R dimensions and is sent as a weight vector $W^1$ to the first layer. These distances (dist) are used to compute thanks a gaussian function (G) the activity of the neurons which is sent to the inputs ($a^1$) of the second layer. The second layer of the RBF is like the perceptron P according to the first embodiment.

It is equivalent to use an adaptive filter in spite of a linear perceptron for the second layer.

Thanks sigmoid transfer function, there are reliance values at the outputs, and the higher the value is, the more likely the prototype is to be the good one. The reliance values at the outputs of the predictor can be interpreted like a note that the network gives to the associated prototype. And these n prototypes can be classified in the descending order of this note. The predictor has one reliance value output ($a^2$) for each prototype of the set of Q prototypes. The prototype having the best note becomes the one predicted. If the prototype having the highest reliance value corresponds to the selected prototype, one indicates by any means an information that the prediction is right.

If it is false, the next prototypes in the order have to be examined by adequate means. If the selected prototype is found among these next n prototypes having the n next highest reliance values, it is sufficient to send the place of the selected prototype among said n prototypes in the order, i.e. a word of only $\log_2(n)$ bits, wherein n is smaller than the maximum number of prototypes. The image is then coded as the place of the predicted prototype in the order of the reliance values at said outputs.

For a better quality, it is possible to send also the relative error between the predicted prototype and the coded data according to the first coding type.

Another subject matter of the invention is a method of construction and working out of a dynamic base, such as the learning base used for image compression by means of principal component analysis and independent component analysis, in order to adapt, during compression, the components to the sequence to be compressed.

Figure 9:
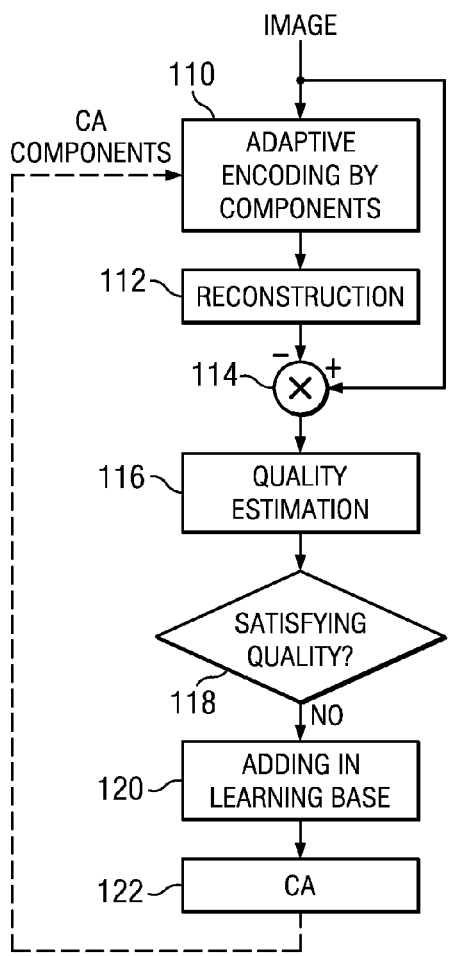
FIG. 9 shows a mechanism of a dynamic evolution of a base of examples.

The method of construction and working out of a dynamic base will be now described by way of example referring to the FIG. 9 which shows a mechanism of a dynamic evolution of a base of examples.

An image is subject in step 110 to an adaptive encoding by components.

In step 112, the image is reconstructed.

During step 116, the image quality is estimated based upon the difference made at step 114 between the image encoded by components and the non-encoded image.

During step 118, the satisfactory quality of the image is determined.

If the image is insufficient, the image is added to the learning base during step 120.

During step 122, the image is subjected to the component analysis and the resulting components are applied to the adaptive encoding of step 110.

The above cycle is then repeated in order to check that the quality of the image encoded with components resulting from the components analysis of step 122, is now satisfactory.

In the case of very long sequences with a progressive modification of the environment, there is a risk to have a base in which one must in permanence add images. This raises several problems:
  Occupation of the memory by the base of examples in proportion which are incompatible with the equipment.
  Very long components calculation time since the correlation matrix is very large.
  When a base contains many examples, the adding of a new image will practically not modify the components after a new calculation.

For seeing a significant evolution of the calculated components, it will be necessary to add the image several times which increases the problem.

Accordingly, one increases the number of examples contained in the dynamic base.

As long as the number of examples in the base is less than a maximal number, one adds the images as described above.

When the maximal number is reached the image is not added but substituted for another one.

The key point is the criterion of decision for this image.

One decides that the image to be replaced is the image which is the less correlated with the new image.

This method ensures a determinist decision and the most rapid possible convergence of the components towards this new image.

The initialization of the base is performed by different means.
  Void base and components equal to zero.
  Base in the state where it was at the end of the previously coded sequences.

The error is estimated by the mean square error between the reconstructed image and the original image.

The dynamic base is also used for the error encoding in a videotelephony image compression system based on the use of PCA and ICA.

Even after a judicious selection of the base, some images still cannot be encoded.

Further to the fixed base selected, a method based upon the working out of an error base will be described hereunder.

The system uses two bases.

The first base is fixed and has calculated N components through a preprocessing.

The second base is initially put to zero.

The compression of an image is carried out simultaneously by using the precalculated components of the first base and the components obtained from the second base.

Upon encoding, if the error between the reconstructed image and the real image is beyond a determined threshold, the image of the difference is added to the second base and the principal components analysis (PCA) and then eventually the independent components analysis (ICA) are recalculated on said base.

The principle of construction of the second learning base (through difference images) warrants that it generates a space orthogonal to the components of the first base, and that the projection base composed of components calculated from each learning base is consequently always an orthonormed base, and thus the encoding by compression using PCA and ICA can still be used.

The updating of the videotelephony images learning base used in data compression by PCA and ICA will now be described.

It is assumed that the used videotelephony encoding system needs learning bases from which are deduced elements allowing an adaptive encoding.

What is interesting is the manner of making the learning base to evolve when necessary in order to be able to encode images which were not in said base before.

The strategy is the following.

When a new image is to be encoded, one estimates the quality of the image which will be reconstructed by the adaptive method.

If the quality is sufficient, the adaptive encoding is used. If the quality is too bad, one adds the image to the base and one recalculates the elements allowing an adaptive encoding.

The completion, during the use, of the learning base also permits to adapt the encoding during the discussion, which can thus allow to cancel or at least to strongly reduce the acquisition step of the learning base.

The updating as just described may require a great memory volume since one needs in critical cases to send very often a new image.

If one wills to enhance the number of examples, the beginning is the same but as soon as one has the maximum number, a replacement is necessary.

The replacement method is now described.

Since one uses PCA which is based on the uncorrelation, in fact one replaces the less correlated image (i.e. the closest to 0 absolute value of the projection) with the new image to be added.

In this way, means are provided for avoiding any memory divergence of the learning base owing to an automatic replacement mechanism when the maximal number of samples is reached in the learning base.

A pertinent, efficient and reproducible method of selecting which image must be replaced is provided.

Now is described hereinafter with reference to the compression of a mouth in videotelephony and then of a complete face, a method of transmission of an image between a transmitter and a receiver. The present invention can also be employed to code any deformable objects, like the eyes or any different deformable object.

The method of transmission is described with reference to FIGS. 10A, 10B, 10C, 11A, 11B, 12, 13, 14, 15, 16.

Increasingly compressed image coding levels or types are defined in the transmitter and conversely in the receiver for decoding the code received from the transmitter.

The lowest coding level or type corresponds to the use of no adaptive encoding method, and thus of a generic compression method like the H.263 recommendation.

The first coding level or type using an adaptive method corresponds to a reduction of the freedom degrees by the components analysis (CA), i.e. principal components analysis (PCA) or independent components analysis (ICA). In videotelephony, an image containing the mouth can consist of more than 3000 pixels (3456 for a rectangular zone 48*72). Even by considering only brightness, it is already more than $10^{8323}$ different images that can be represented in this vector 3456-space. But here, we code a quite particular object that is the mouth of a person and that is associated to a very small subspace. A means of reducing the dimension of the vector space is the use of component analysis. Once the components are calculated, an image can be coded by the projection coefficients of this image on the components. Only these projection coefficients are sent (after scalar quantification and compression without loss) and the receiver, which has same the components, can rebuild the image.

The second coding level or type of the adaptive method corresponds to the restriction of the possibilities by vector quantization. With the preceding stage, we reduced the vector space of the images but it is still possible to build impossible images like an image where teeth can be seen in transparency on the upper lip (the mixture of a closed mouth image with an wide open mouth image). The vector quantization enables to avoid the possibility of coding such images, and thus to still reduce the entropy of the code, i.e. to improve the compression rate. In practice, the captured image is quantified by a prototype-image belonging to a precalculated base and it can be sent by the transmitter the selected image prototype for example in form of a label associated with the image prototype. If a very good quality is wished, the error between the selected prototype and the captured image can also be joined.

The third coding level or type of the adaptive method corresponds to the exploitation of temporal dimension by predicting the image to come. Indeed, for mobile objects as the mouth, it is sometimes possible to guess the image normally displayed according to the previous images, since the movement of the mouth, although sometimes very fast, does not remain less continuous about it.

Thanks to the invention, at nearly constant quality, the higher the coding level is, the more raised the compression ratio is. At nearly constant bit rate, the higher the coding level is, the best the quality is.

In step S2, the connection between the transmitter and the receiver is made, dialling the videotelephone number. The video signal is acquired in step S4 by activating a video camera. The different parameters of the system are initialised and the localization of the different areas is defined during step S6. These data are then transmitted to the receiver in order to synchronise it with the transmitter, in step S8. It is determined whether the transmission is complete, in step S10. If it is, the connection between the transmitter and the receiver is terminated, in step S12, and use of the system ends, in step S14.

In step S10, if the transmission has not been completed, the object to be coded is localized, in step S16, for example by tracking it, or by isolating it from the remainder of the frame, according to other system possibilities. Then at step S18, the flow chart shown in FIG. 10A continues on FIG. 10B.

In step S22, the mean of the image is computed in order to centre it, and projection coefficients are computed, according to the first coding type. These coefficients are then quantified in step S24. From these quantified coefficients and the mean, forming the first code obtained by the first coding type, an image is rebuilt and the distortion or first coding type error with the original image is computed, in step S26. In step S28, this distortion is compared to a first threshold T1.

If the distortion is greater than T1, the original image is encoded according the available generic compression method, which is not adaptive, here the H.263 recommendation, in step S30. Following step S30, the code of the image is transmitted to the receiver, in step S32. Then, it is decompressed to rebuild an image, in step S34. The rebuilt image is added to the learning base of component analysis in step S36. Thus, new components are computed in the transmitter, in step 38. Then, the images present in the CA learning base are centred and projected on these new components, in step S40. Then, in step S42, these series of coefficients are used to reinitialise the second dynamic vector quantization (VQ) learning base, so that new image prototypes are computed in step S44. The processing is then resumed in steps S46 and S20 in FIG. 10A.

Figure 10A:
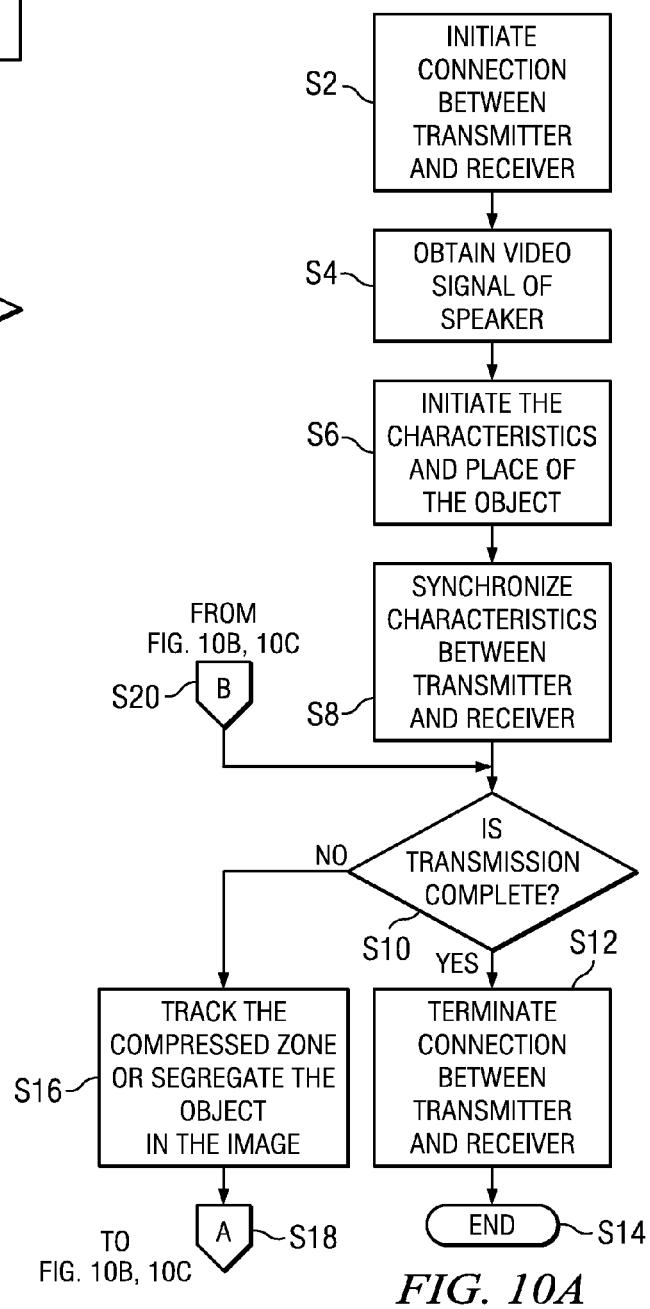
FIG. 10A shows a general transmitter flow diagram.
Figure 10B:
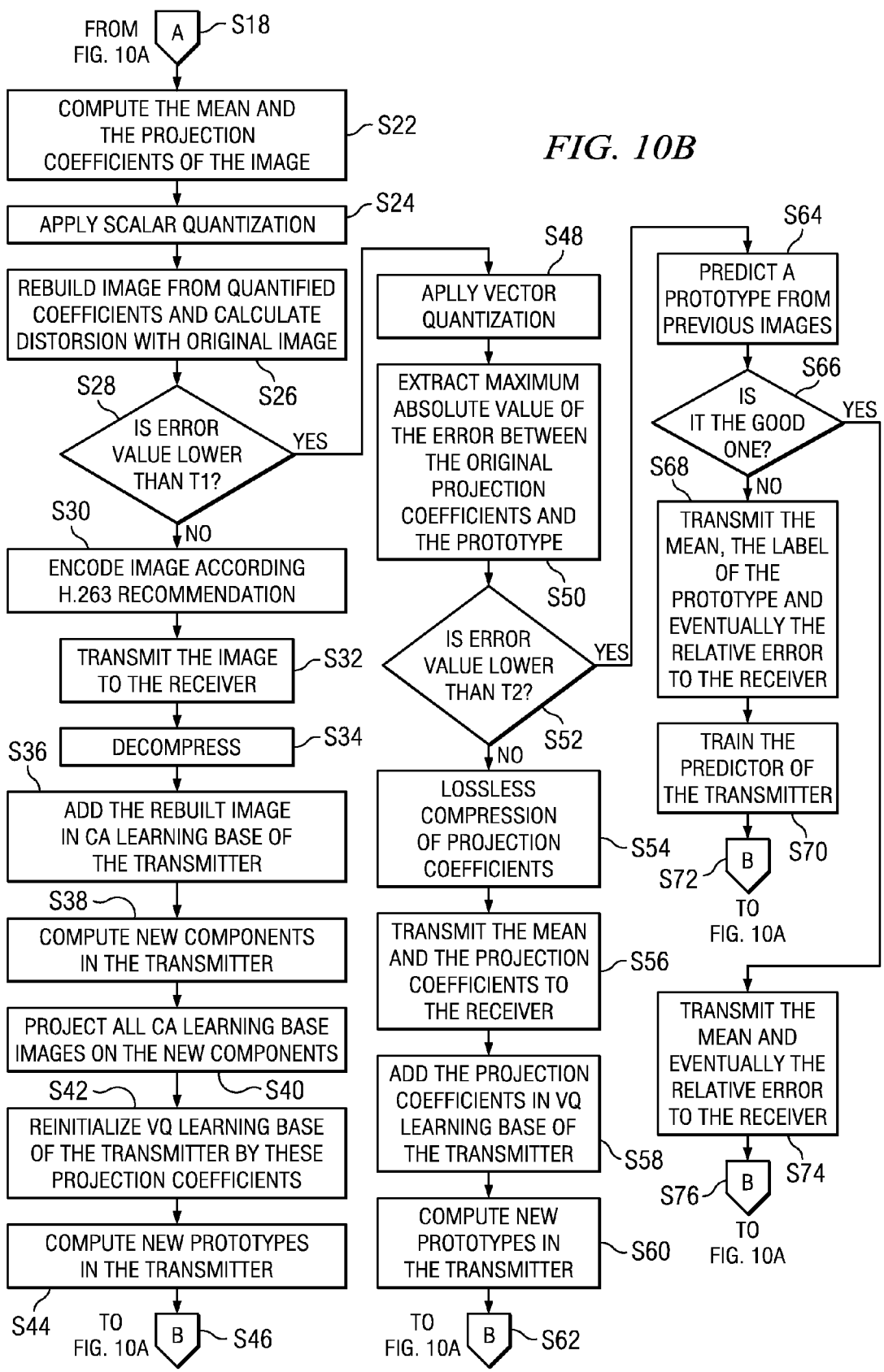
FIG. 10B shows the transmitter flow diagram according to a first embodiment of the present invention.

In step S28 of FIG. 10B, if the distortion is lower than. T1, then a second coding type comprising vector quantization described hereinafter is applied, in step S48. In vector quantization, a second code comprising an image prototype is selected based on the first code. A second coding type error, equal for example to the maximum absolute value of the error between the original projection coefficients and the prototype coefficients is calculated in step S50 in step 52, this value of the second coding type error is compared with a second threshold T2. If the value is greater than T2, a lossless compression algorithm is applied on the projection coefficients after scalar quantization, in step S54, and the result with the mean, forming the first code of the image, are sent to the receiver, in step S56. These scalar quantified coefficients are furthermore added to the second VQ learning base, in step S58, and prototypes are computed again, step S60. The processing is then resumed in steps S62 and S20 in FIG. 10A.

In step S52 of FIG. 10A, if the second coding type error is lower than T2, then the previous images are used to predict an image prototype, in step S64, by using a predictor described hereinafter. In step 66, the predicted image prototype is compared to the real image prototype found in step S48. If it is not the same, the second code comprising the mean, the label of the prototype and eventually a part of the relative error between the prototype and the projection coefficients are sent to the receiver, as shown in step S68. Then, the predictor of the transmitter is trained so that it takes into account previous images which may be followed by the prototype sent to the receiver, in step S70. The processing is then resumed, in steps 72 and S20 in FIG. 10A.

In step S66, if the predicted prototype is the same as the second code, the mean and eventually a part of the relative error between the prototype and the projection coefficients, forming the third code of the image, are sent to the receiver, as shown in step S74. The processing is then resumed, in steps S76 and S20 in FIG. 10A.

Figure 10C:
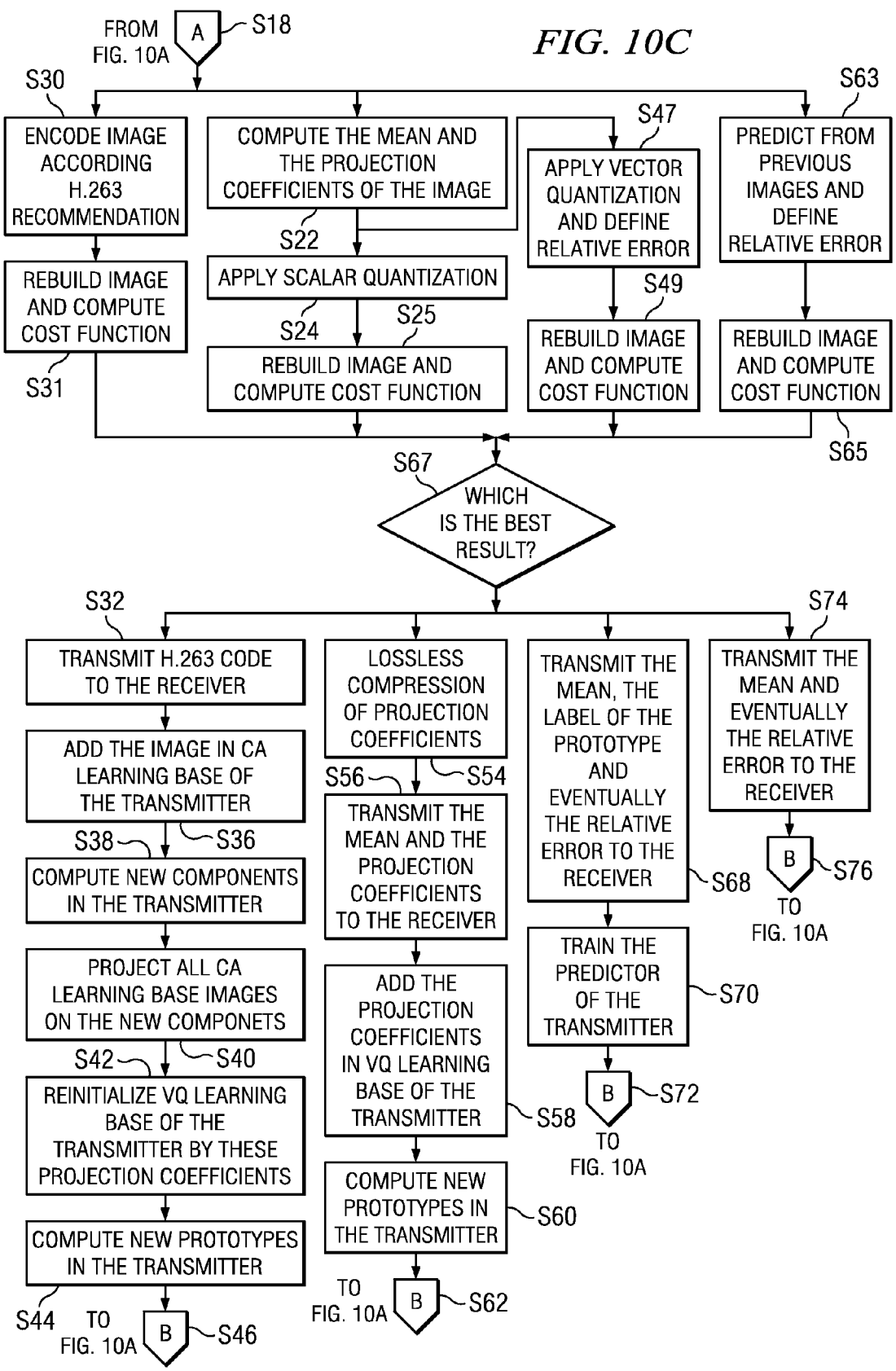
FIG. 10C shows the transmitter flow diagram according to a second embodiment of the present invention.

In a second embodiment of the present invention shown in FIG. 10A and continued in FIG. 10C, the different codes of the image according to the non adaptive coding type and to the first, second and third coding types are always computed and the selection of the code is made according to a cost function using coding type errors associated to said coding types. The process steps S2, S4, S6, S8, S10, S12, S14, S16 shown in FIG. 10A are followed for the second embodiment and are continued at step S18 in FIG. 10C.

Following step S18 of the second embodiment, the original image is encoded according the available generic compression method, which is not adaptive, here the H.263 recommendation, in step S30, as in the first embodiment. The code is decompressed to rebuild an image according to the non adaptive method and a cost function is evaluated for this rebuilt image.

Following step S18 of the second embodiment, a second computation applies step S22 described for the first embodiment. Then, on the one hand, scalar quantization is applied, in step S24 described for the first embodiment, and an image is rebuilt according to the first coding type, based on the first code generated for the image. The cost function for the first code is calculated, in step S25. On the other hand, after step S22, the second coding type with vector quantization is applied, the second code of the image is calculated and a part of the relative error between the prototype and the first code is estimated in step S47. Again, an image is rebuilt and the cost function for the second coding type is evaluated in step S49.

Following step S18 of the second embodiment, a third computation consists in predicting a prototype from previous images and a part of the relative error between the predicted prototype and the first code, for calculation of the third code of the image, in step S63. Again, an image is rebuilt and the cost function for the third coding type is evaluated, in step S65.

After these parallel computations, a comparison of the four evaluation of the cost function is made in step S67 in order to select the code that minimizes the cost function. The cost function can be for example the following function C, which takes into account the transmission bit rate and the image distortion or coding type error calculated for the image:

$$C=\alpha.B+\beta.D$$

where B is the bit rate needed to send the code associated to a coding type, D is the distortion between the original image and the image rebuilt from the generated code, $\alpha$ and $\beta$ are parameters which can be set by the user ($\alpha=0$ implies that only the distortion is used to select the code, $\beta=0$ implies that only the transmission bit rate is used to select the code).

In step 67, if the code of the image that minimizes the cost function is the non adaptive code, then this code is sent from the transmitter to the receiver and used to update the learning bases used by the other coding types, and steps S32, S36, S38, S40, S42, S44 and S46 as described for the first embodiment are executed.

In step S67, if the code that minimizes the cost function is the first code, then the first code is sent from the transmitter to the receiver and used to update the learning bases used by the second and third coding types, and steps S54, S56, S58 and S60 as described for the first embodiment are executed.

In step S67, if the code that minimizes the cost function is the second code, then the second code is sent from the transmitter to the receiver and used to train the predictor, and steps S68, S70 and S72 as described for the first embodiment are executed.

In step S67, if the code that minimizes the cost function is the third code, then the third code is sent from the transmitter to the receiver and steps S74 and S76 as described for the first embodiment are executed.

Figure 11A:
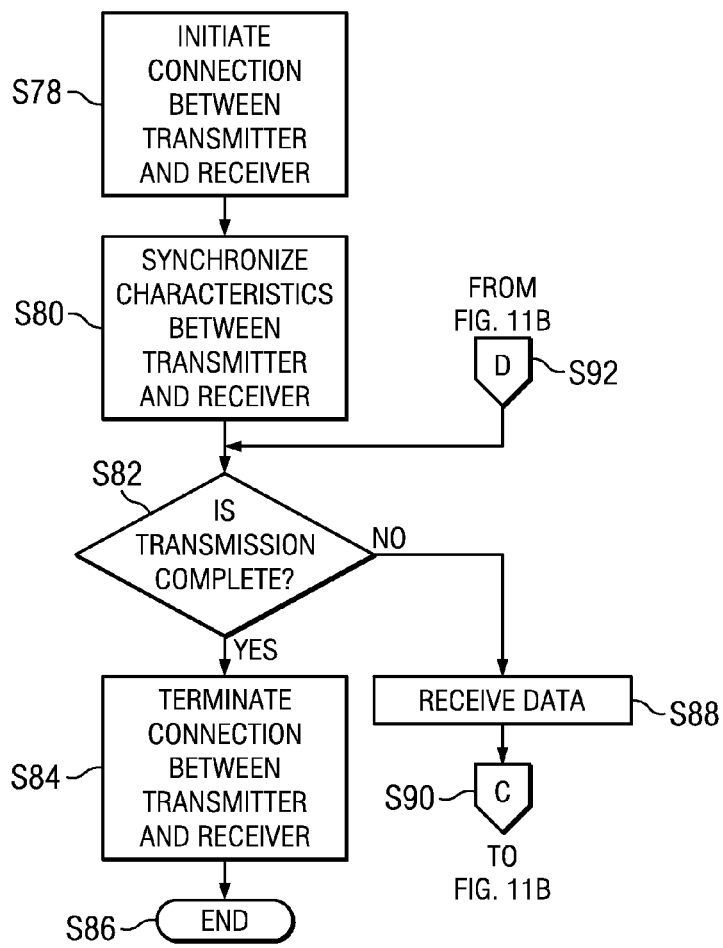

The process executed in the receiver will now be described. Referring to FIG. 11A and FIG. 11B, the receiver also initiates the connection in step S78, and synchronise its parameters to those defined in the transmitter in step S80, as in steps S2 and S8 in the transmitter Then it is determined whether the transmission is complete, in step S82. If it is, the connection between the transmitter and the receiver is terminated in step 84, and use of the system ends, in step S86.

In step S82, if the transmission has not been completed, data are received, in step S88, and the flow chart shown in FIG. 2A continues on step S90 in FIG. 11B.

In step S94 following step S90, the level or coding type used for the compression is identified and used in step S96 to define the flow to follow. This identification is made by a recognition of the code received from the transmitter or by the reception of a coding type identification sent by the transmitter with the corresponding emitted code.

If the code according to the non adaptive method was used, the code is decompressed accordingly in step S98 in order to rebuild an image. Then, on the one hand, the rebuilt image is displayed at the proper position in the whole frame, in step S100. On the other hand, it is added to the first learning base of component analysis in step S102. Thus, new components are computed in the receiver, in step S104. Then, the images present in the first CA learning base are centred and projected on these new components, in step S106, and new projection coefficients are calculated. Then, in step S108, these series of projection coefficients are used to reinitialise the second VQ learning base in the receiver, and new image prototypes are computed in the receiver based on this second VQ learning base, in step S110. The processing is then resumed in steps S112 and S92 in FIG. 11A.

In step S96, if the first code was used for the transmission, then the lossless compression algorithm of step S54 is inverted in step S114, for obtaining the projection coefficients as well as the mean, from which an image is rebuilt, in step S116. This image is displayed at the proper position in the whole frame, in step S118. The projection coefficients are also added to the second VQ learning base, in step S120, and prototypes are computed again, in step S122. The processing is then resumed in steps S124 and S92 in FIG. 11A.

In step S96, if the second code was used for the transmission, then, in step S126, an image is rebuilt from the mean, the selected prototype and eventually a part of the relative error, which are received from the transmitter. This image is displayed at the proper position in the whole frame, in step S128. Then, the predictor is trained so that it takes into account previous images which may be followed by the received prototype, in step S130. The processing is then resumed in step S132 and S92 in FIG. 11A.

In step S96, if the third code was used for the transmission, then previous images are used to predict a prototype, in step S134. An image is rebuilt from the mean, the predicted prototype and eventually a part of the relative error, in step S136. This image is displayed at the proper position in the whole frame, in step S138. The processing is then resumed in steps S140 and S92 in FIG. 11A.

Figure 12:
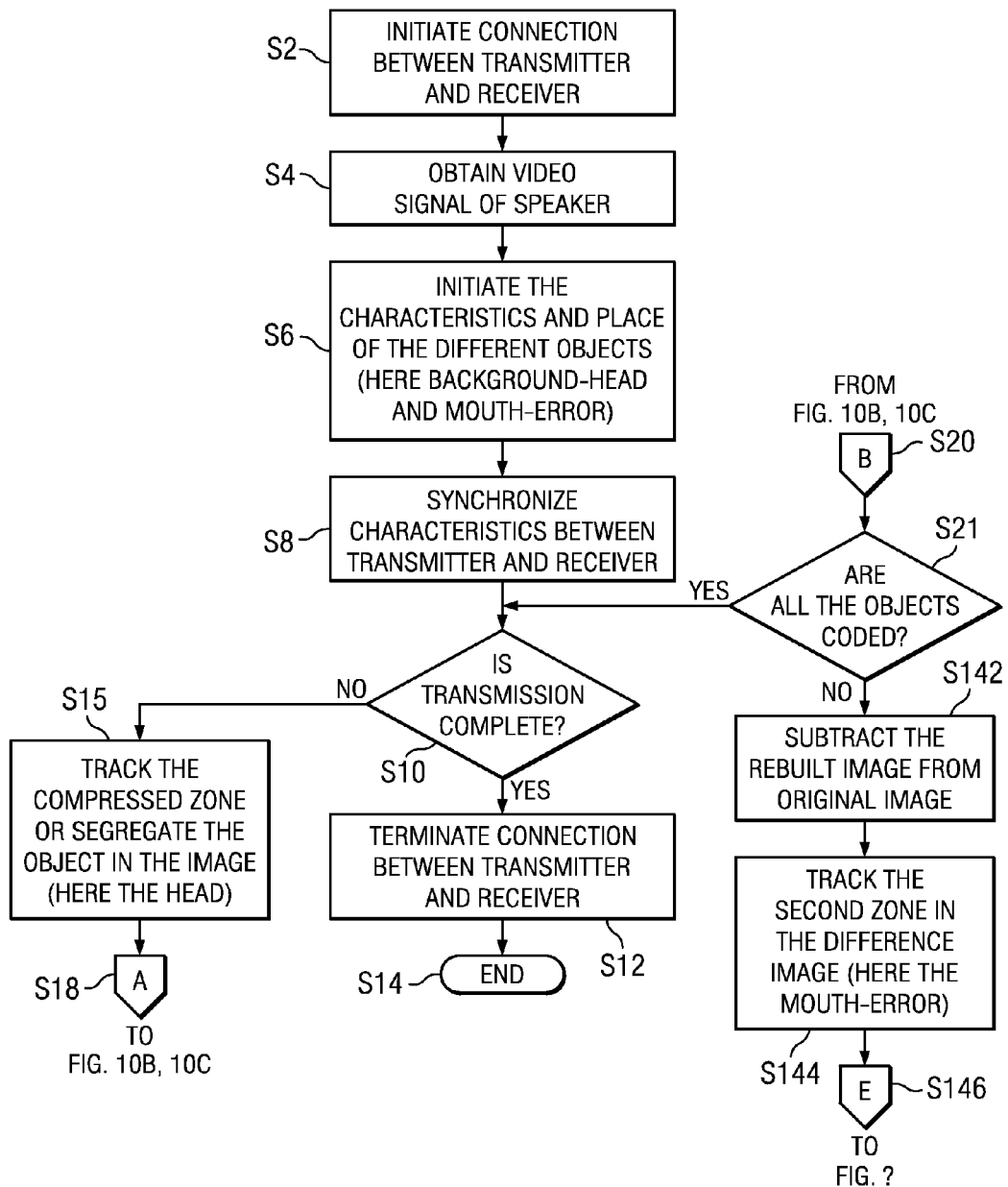
FIG. 12 shows the transmitter flow diagram of the embodiments of the present invention, four coding of two different objects in the same frame.
Figure 14A:
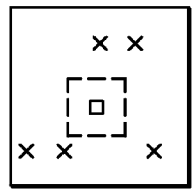
FIG. 14 illustrates a searching diagram used in vector quantization.
Figure 14D:
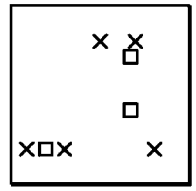
Figure 14B:
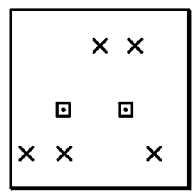
Figure 14E:
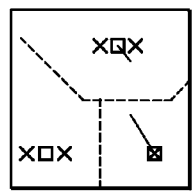
Figure 14C:
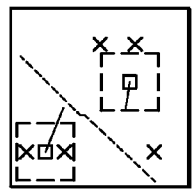
Figure 14F:
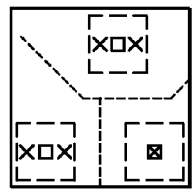

Referring now to FIG. 12, a diagram is shown for coding the whole face or more than one deformable objects such as the mouth and the eyes or other deformable objects. The initialisation of the transmitter and the detection of the end of the connection are made as described above with respect to steps S2, S4, S6, S8, S10, S12 and S14. For example, in step S6, the background head and the mouth are localized. In step 10, if the transmission has not been completed, the first object to be coded is localized in the image for example of the head, in step S15, by tracking it, or by isolating it from the remainder of the frame, according to other system possibilities. Then at step S18, the flow chart continues on step S18 in FIG. 10B or 10C, as described above. When reaching step S46, S62, S72 or S76, the processing comes back on FIG. 12 to step S20. In the following step S21 it is determined whether all the objects of the image are coded.

If it is determined in step S21 that there is still an object to code, the image rebuilt from the code sent to the receiver is subtracted from the original image, which define a new original image, in step 142. The second object to be coded is then localized in this new original image, in step S146, for example by tracking it, or by isolating it from the remainder of the frame, according to other system possibilities. Then the flow chart of FIG. 12 continues on step S146 and S18 of FIG. 10B or 10C, as described above. When reaching step S46, S62, S72 or S76, the processing comes back on FIG. 12 to step S20.

If it is determined in step S21 that there is no object to code anymore, step 21 is followed by step S10.

As described above, there is provided at once bases of examples in the transmitter and in the receiver and said bases are always arranged identical.

Thus, the same image (degraded image of the original image) has been added to the base of examples of the transmitter and to that of the receiver.

As the bases of examples were identical before, they remain identical.

The necessary elements for the adaptive encoding are then calculated again (according to a determinist method) simultaneously in the transmitter and in the receiver.

The elements are consequently identical in the two modules, which permits to use the adaptive encoding at the occurrence of the next image of the sequence without the need to return the integrality of the elements for matching the transmitter and the receiver.

Initially, it is assumed that the transmitter and the receiver have the same learning base (possibly void).

What is interesting here is the manner to ensure that the calculated elements are identical in the transmitter and in the receiver whereas the transmission between the transmitter and the receiver requires a source encoding with losses.

The method of following a deformable object in acquired images will now be described with reference to FIGS. 17 to 21.

The compression is based on the principal components analysis algorithm described above.

By way of example the equipment used for implementing the method of the present invention includes a Matrox Meteor II acquisition board, and the Matrox Imaging Library to control it. The applications were developed under Visual C++5.0 using MFC.

The PC has got a Pentium II 233 MHz processor.

Concept:

The goal of the PCA algorithm is to operate a reduction of dimension among a set of samples. These samples must be near enough to allow a good reduction. For example, a mouth has a limited amount of shapes, so a reduction of dimension is relatively adapted as a method of compression to this part of the human face.

The criterion to select the axis of the space of reduction consists in maximising the sum of the squares of the distances between the projected samples. The mathematical expression is the following:

$$\text{Find}: \underset{(H)}{\text{Max}} \left\{ \sum_i^n \sum_{i'}^n d_H^2(i, i') \right\}$$

Where (H) is the subspace of projection to find i and i' are the points of the set (one sample is represented by a point). $d^2H(i,i')$ is the square of the distance between the projections of i and i' on (H). So the unknown is (H). i is a mouth in the application. The dimension of the original space (E) is n=number of pixels in a picture.

This criterion gives more importance for the points which are the furthest from the subspace of projection.

Algorithm

It is wanted to find a subspace of projection that verifies the previous criterion.

Furthermore, one has to find some properties in order to reduce the amount of calculations because it is wanted to apply this algorithm in real time.

One can demonstrate that the previous criterion is equivalent to find (H) where $$\sum_i d_H^2(i, O)$$

is maximum. O is the average point of all the points of the sample and it is the centre of space (E) (the cloud of points is considered as centred in this way).

Let be reminded that, concerning the present applications, the points of the space (E) are the pictures of mouth and the dimension of this space (E) is the amount of pixels in a picture.

Let $u=(u_1, u_2, \ldots u_p)$ be an othonormed base of the space (H) of projection being looked for. So one considers that the dimension of (H) is p.

Let $X=(x_1, x_2, \ldots, x_k)'$ be the set of centred points i. $X_1$ is the vectorial representation of a point $i_1$ in (E), where ' means the transposition. Here, there are k samples (k mouths is the present application).

So, $\sum_i d_H^2(i, O) = \sum_i OH_i^2 = \sum_j (Xu_j)' \cdot (Xu_j) = \sum_j u_j' X' X u_j$ (scalar product).

Where $H_i$ is the projection of the point i on (H).

Here, the calculations are carried out in (E).

The eigenvectors $(u_1, u_2, \ldots u_p)$ of X'X corresponding to the p greater eigenvalues $\lambda_1, \lambda_2, \ldots \lambda_p$ maximize $$\sum_j u_j' X' X u_j.$$

In the present application, one takes $\lambda_1 > \lambda_2 > \ldots, > \lambda_p$ for easier comprehension.

So let $(\lambda_1, \lambda_2, \ldots, \lambda_p)$ be the eigenvalues corresponding to the eigenvectors $(u_1, u_2, \ldots, u_p)$. So $X' Xu_i = \lambda_i u_i \Rightarrow (XX')$. $(Xu_i) = \lambda_i (Xu_i)$.

So, one can demonstrate that $\lambda_1, \lambda_2, \ldots, \lambda_p$ are the p greater eigenvalues of XX'.

Let $(v_1, v_2, \ldots, v_p)$ be the p eigenvectors of X.X' corresponding to $(\lambda_1, \lambda_2, \ldots, \lambda_p)$ and creating an orthonormed base. One can see that $v_i$ is proportional to $X.u_i$ because there are eigenvectors of the same eigenvalues.

Furthermore, $\|v_i\|=1$ and $(Xu_i)'.(Xu_i)=\lambda_i \Rightarrow \|Xu_i\|=\sqrt{\lambda_i}$.

So one can conclude that $$u_i = \frac{1}{\sqrt{\lambda_i}} X' \cdot v_i.$$

So one can obtain the eigenvectors and eigenvalues of X'X with the eigenvectors and eigenvalues of XX'. This is particularly useful because in the present application, X is a matrix with a dimension of (amount of pictures k* amount of points per picture n) where n>>k.

So one has to reduce a matrix of very little dimension (k*k) compared to the original matrix (n*n).

This is a decisive factor for increasing the velocity of the algorithm.

Furthermore, one has to reduce a real symmetric matrix so one can use some specific algorithms. Firstly, a method is used to obtain a tridiagonal matrix from the real symmetric matrix and then, the Householder's method is used to extract the eigenvalues and the orthonormal eigenvectors from the tridiagonal matrix.

The base of projection has been extracted and it can now be seen how to use this base.

In the first step, a certain amount of mouths of various shapes is recorded. The base is constructed with these pictures. Then, mouths that are not in the base are presented. These pictures of mouth are projected on the base. The coordinates $\omega_1, \omega_2, \ldots, \omega_p$ corresponding to the values of the projections on the vectors of the base (scalar product) as $\omega_1 = u_j'.X$ are kept, if X is the picture of the mouth to be projected.

Then these coordinates to rebuild an approximate picture of the original picture can be used.

Only a few coordinates $$X_{rebuild} = \sum_j \omega_j u_j$$

are needed.

Statement of Work

The problem is to implement the Principle Components Analysis for the compression of a mouth.

Once implemented, an evaluation of the results is carried out and parameters (notably building of the base, number of eigenvectors taken for reconstitution) can be optimised.

The objective is to improve videotelephone quality.

Accordingly, it has been decided to build a real-time system that would simulate the whole process.

Said system basically comprises:
video acquisition
mouth region extraction to obtain a vector
projection of this vector on the base to obtain coefficients
transmission of these coefficients
reconstitution of the vector;
interpretation of the vector as a picture (the mouth region)
display of the mouth region.

a) Video Acquisition

The pictures are acquired with a scaling of 0.5 in both directions, leading to 320×240 pixels pictures. The scaling is computed by the Matrox acquisition board.

Before the beginning of the process, pictures are grabbed continuously in one buffer that is displayed.

When the process begins, there is some processing to do on each picture. A double buffering technique such as the matrox imaging library (MIL) is used. The buffer that is being processed is displayed.

A white rectangle shows the region that is extracted for processing. In the base version, it allows the user to know where to place his/her mouth.

In all versions of the software implementing the method of the invention, displaying original stream allows comparison with the reconstituted stream.

b) Mouth Region Extraction

One extracts from the acquired image (320×240 pixels, 1, FIG. 4) a window (70×50 pixels) containing the mouth. So a vector whose dimension is 3500 is obtained.

c) Projection on the Base

Loading of the Base

At application's launching, the base is loaded from a file generated by a Base Maker which has performed the principal components analysis on a set of mouth examples.

So, one retrieves: the mean vector and a certain number of eigenvectors. As explained above the dimension of all these vectors is 3500.

Projection

The vector obtained at step b) (in fact, minus the mean picture) is projected on each vector of the base in order to get one coefficient per vector.

Number of Vectors Taken

An important parameter is the number of vectors taken. The importance of an eigenvector is given by its associated eigenvalue. If the eigenvectors are listed from the most to the less important, upon drawing the graph (number of the vector, associated eigenvalue), the diagram of FIG. 2 is obtained.

The curve shape is characteristic and looks like a decreasing exponential curve. There is an angular point beyond which the eigenvalues are rather low and do not decrease much.

This shows that a few eigenvalues (therefore eigenvectors) bring much energy, if one defines the energy for each eigenvalue by: $E_i = L_i / \text{sum}(L_j)$.

In fact, the more energy a vector supplies, the more it is important in reconstitution. This can be checked because when taking a certain number of vectors for reconstitution, the same behaviour regarding quality is observed.

The cumulative amount of energy can be seen on FIG. 3.

This curve can be interpreted as the quality of reconstitution when rebuilding known pictures. So here, with 7 pictures, 80% are reached. This criterion of 80% can be applied to set the number of eigenvectors to be taken. Let be N this number.

In fact, N raises with the richness of the set of initial pictures.

d) Transmission of the Coefficients

The objective is to minimise the amount of data transferred between the emitter and the receiver. So one byte per coefficient is authorized:

the highest coefficients' absolute value is looked for;
all the coefficients are divided by this value;
then a multiplying by 127 is performed and the nearest integer is taken.

Then the value by which one must multiply the one-byte-coded coefficients to retrieve the initial values must be sent.

e) Reconstitution of the Vector

The coefficients are transformed as seen just before. Each base vector is multiplied by the corresponding coefficient and all is added. Then the mean vector is added and the reconstituted vector is obtained.

Interpretation of the vector as a picture.

Figure 4:
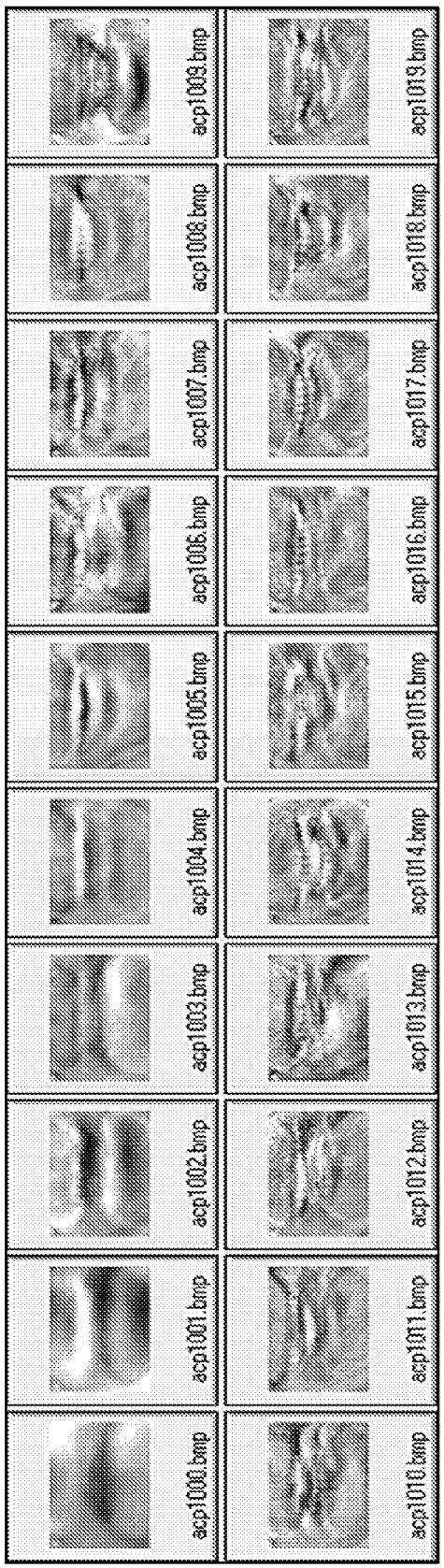
FIG. 4 shows 20 vectors of the PCA with an architecture 1 for a first series.

One displays the reconstructed mouth region in a window display which has the same size as the whole picture (1, FIG. 4).

The position of the mouth region is transmitted.

Immobile, head same light conditions One sequence of about 500 pictures was just recorded, the person had his head immobile and had to talk in order to have a sufficient number of mouth shapes.

To get pretty good results, one had to:
place the mouth ideally;
be in the same conditions as for the recording, i.e. be at the same distance from the camera and have the same light conditions for instance.

To overcome these difficulties, one decided to explore among other things the tracking of the mouth to have it well-placed for PCA processing.

It has been seen that due to the existent base one can have a good reconstitution in return for an ideal locating of the mouth (within one pixel).

Now the quality of the reconstitution can be judged by computing the distance between the original vector and the reconstituted one.

As the quality is maximum when the mouth is well located, one can compute projection and reconstitution for several neighbouring regions and take the one for which the error is minimal.

This allows in the same time to track the mouth.

FIG. 4 shows schematically the tracking of the mouth.

In this figure, the reference numeral 1 refers to the whole picture, the reference numeral 2 refers to the region on search in the picture 1 and reference numeral 3 refers to the previous location of the mouth within the region of search 2.

Upon applying plainly the above method, it takes a long time, more than what is acceptable.

In fact the method is time consuming since for each position one has to perform a projection, a reconstitution and a distance calculation.

Since the number of positions grows with the square of the displacement one has to do, if it is the same on X and Y axes, the amount of calculations is important.

According to the invention the algorithm is adapted in order to drastically reduce this time.

According to a first improvement the projection is carried out only onto a few of eigenvectors.

Since the aim is only to find the best position of the mouth and since the first eigenvectors are the most significant, there is no need to project onto a great number of vectors.

In practice about 5 or 6 vectors appear to be sufficient.

According to a second improvement the error is calculated.

Instead of projecting and reconstituting the vector, means are provided for calculating the distance between the original vector and the reconstituted vector by carrying out half of calculations as explained in the above cited Turk and Pentland reference, integrated herein by way of reference.

According to a third improvement the size of the picture is reduced by 4×4=16.

In order to speed up the calculation one has tried to work on smaller pictures.

A specific base of smaller eigenvectors obtained with 16 times reduced pictures is built:

the pictures are reduced by 16 before projection.

According to a fourth improvement a search algorithm is applied.

At present one performs an exhaustive search in the defined area.

Supposing that the error decreases when approaching the right location, one could perform a non-exhaustive search.

This is what one has tried to do on the basis of the orthogonal search algorithm.

The following test and picture has been loaded from the web site atlantis.ucc.ie (full URL: atlantis.ucc.ie/dvideo/dvbm OSA.html)

Orthogonal Search Algorithm—OSA

The orthogonal search algorithm is an attempted hybrid of the 2-D logarithmic (TDL) search and three steps search (TSS).

Figure 5:
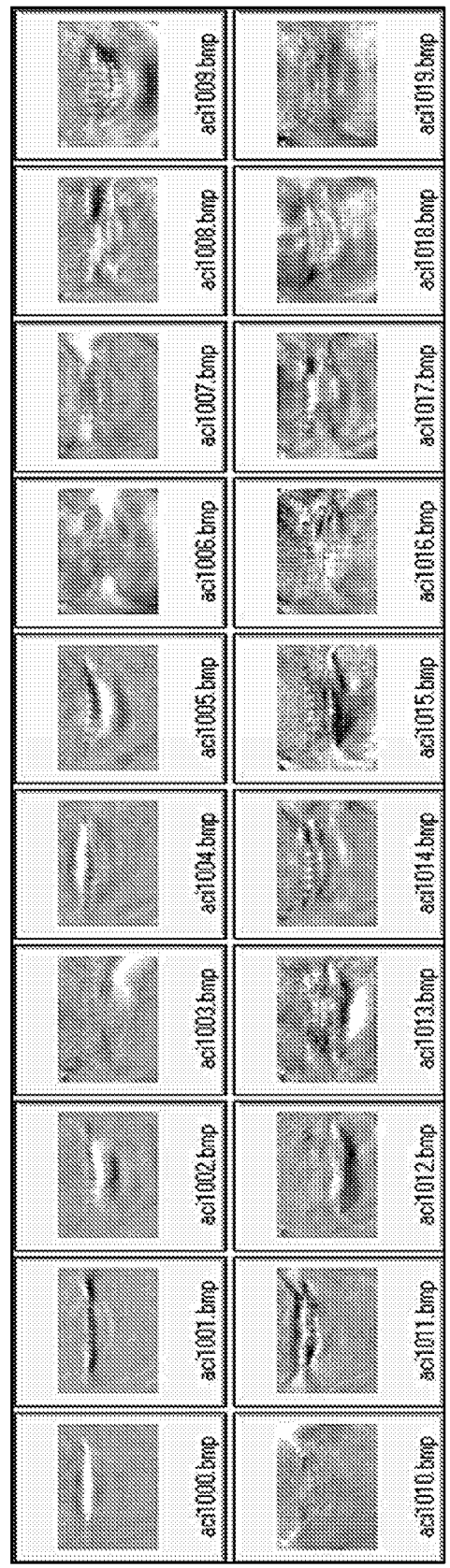
FIG. 5 shows 20 vectors of the ICA with architecture 1 for the first series when the size reduction is performed upon whitening.

The OSA has a vertical and a horizontal stage as shown at FIG. 5.

After the step size S has been initialized to (d+1) div.2, where d is the maximum displacement, the centre block and two candidate blocks on either side of the X axis are compared to the target block.

The position of minimal distortion becomes the centre of the vertical stage.

During the vertical stage two points above and below the new centre are examined and the values of the distortion function at these three positions are compared.

The position with the minimum distortion becomes the centre of the next stage.

After one horizontal and vertical iteration the step size is halved if it is greater than one and the algorithm proceeds with another horizontal and vertical iteration.

Otherwise it stops and declares one of the positions from the vertical stage the best match for the target block.

One can see from FIG. 5 wherein the numbers 1-6 correspond to first to sixth iterations respectively, that the number of exposed positions is drastically reduced, especially when the displacement is important.

One can also see that one cannot apply this algorithm when the displacement is too important, because one has only three choices at first.

This would not be sufficient for a displacement greater that about 10.

So this algorithm is well-adapted for tracking i.e., when one knows the latest position of the mouth.

Finally, the above described four improvements allow a very fast and efficient tracking of the mouth.

It gives good results but one has to foresee the cases where the mouth is lost (if it moves too fast or if it disappears).

One sees here the necessity of having a system able to detect the presence and the position of a face in the screen so that one can switch on it when the mouth is lost.

One knows the mouth is lost when the projection error is too high.

What is claimed is:

1. A method of compression of videotelephony images, comprising:
creating a learning base containing images in an apparatus;
centering the learning base about zero;
determining component images by independent components analysis;
keeping a number of significant components.

2. A method as claimed in claim 1, wherein said step of determining component images is by independent and principal components analysis.

3. A method of compression of videotelephony images, comprising:
creating a learning base containing images in an apparatus;
centering the learning base about zero;
determining component images by components analysis;
keeping a number of significant components;
wherein a second learning base containing example vectors is created, each example vector being represented by the projection coefficients of each example of the first learning base on the components determined by components analysis, and a set of at least one image prototype is defined based on at least the second learning base; and
wherein a maximum number of prototypes in the set of prototypes and a prototype distance threshold are preset, and the set of prototypes is defined by using a searching algorithm, in which a prototype is defined by a vector in the space of the example vectors of the second learning base, said searching algorithm comprises at least an initialization step, consisting in initializing at least one prototype in view of the example vectors, a searching step, consisting in, when the number of prototypes is smaller than said maximum number of prototypes and when there is at least one of the example vectors, whose distance to any of the prototypes is greater than said prototype distance threshold, dividing at least one of the prototypes, having a distance to each of the example vectors greater than said prototype distance threshold, into two new prototypes according to the direction of greatest variance of said prototype in view of the example vectors, and replacing the original prototype by the two divided new prototypes in the set of prototypes, and a positioning step consisting in moving the new divided prototypes in view of example vectors according to the algorithm of aggregation around mobile centers, the searching step followed by the positioning step being repeated until for each example vector, it exists at least one prototype having a distance to said example vector smaller than said prototype distance threshold, or until the number of prototypes, is equal to said maximum number of prototypes, wherein the prototype distance threshold is a power of two.

4. A method as claimed in claim 2, wherein for determining the principal components one searches by calculation eigenvalues and eigenvectors of the covariance matrix of the images of the learning base.

5. A method as claimed in claim 4, wherein the kept components are the eigenvectors associated to the found greatest eigenvalues.

6. A method as claimed in claim 2, wherein the number of the kept principal components being N, said components are the N eigenvectors associated to the N found greatest eigenvalues.

7. A method as claimed in claim 6, wherein if only m<N first principal components are significant, i.e. associated to non zero eigenvalues, the N-m last components are all put to zero.

8. A method as claimed in claim 3, wherein a code of the predicted prototype with the relative error between the predicted prototype and the image coded according components analysis is sent.

9. A method as claimed in claim 1, wherein said components are rendered available for emission and for reception of videotelephony signals.

10. A method as claimed in claim 1, wherein, upon emission, said method further comprises:
encoding of an image by centering of the image and calculating the projection coefficients of the image with each of said components, by means of a scalar product.

11. A method as claimed in claim 9, wherein, upon reception, said method further comprises:
calculating a linear combination of components by using as weights the received projection coefficients established upon transmission, associated to the considered components and then establishing the average of the components and displaying the obtained image.

12. A method as claimed in claim 2, comprising:
establishing a learning base containing images to be transmitted, calculating component images by principal components analysis and independent components analysis and using said images for carrying out a video sequence encoding for transmission thereof.

13. A method as claimed in claims 2, comprising:
establishing a learning base containing images to be received, calculating the component images by principal components analysis and independent components analysis and using said images for carrying out a video sequence encoding for reconstituting during a step of receiving.

14. A method as claimed in claim 1, wherein a second vector quantization learning base containing example vectors is created, each example vector being represented by the projection coefficients of each example of the first learning base on the components determined by components analysis, and a set of at least one image prototype is defined based on at least the second learning base.

15. A method as claimed in claim 14, comprising:
encoding an image by selecting the prototype of the set of prototypes having the smallest distance to said image and sending a code of the selected prototype.

16. A method as claimed in claim 15, wherein each prototype is associated with a label forming a code of said prototype.

17. A method as claimed in claim 14, wherein a code of the selected prototype with the relative error between the selected prototype and the image coded according components analysis is sent.

18. A method as claimed in claim 14, wherein at least the last selected prototype is sent to an input of a trainable predictor for predicting a prototype, which is encoded.

19. A method as claimed in claim 18, wherein the predictor has one reliance value output for each prototype of the set of prototypes, the prototypes are arranged in the order of their reliance values, and if the selected prototype does not correspond to the prototype with the highest reliance value but corresponds to one of the prototypes having the n next highest reliance values, the image is coded as the place of the selected prototype among said n sorted prototypes having the n next highest reliance values, wherein n is smaller than the maximum number of prototypes.

20. A method as claimed in claim 18, wherein the predictor comprises a trainable neural network.

21. A method as claimed in claim 20, wherein the trainable neural network comprises a trainable perceptron.

22. A method as claimed in claim 21, wherein time delays are inserted in the perceptron.

23. A method as claimed in claim 21, wherein the predictor comprises, for each of its outputs a sigmoid function applied to a linear combination of its inputs, wherein the multiplication weights of the linear combinations being trained.

24. A method as claimed in claim 14, wherein the predictor comprises a radial basis function neural network and, for predicting a prototype, the coefficients projections of the image according components analysis are applied to the input of the radial basis function neural network, having a first layer, in which distances between the input and weight vectors calculated based on the set of prototypes are computed, said computed distances being used to compute, by an activation function, outputs of the first layer, and a second layer, having the function of a perceptron applied to the outputs of the first layer, the outputs of the second layer serving to produce a predicted prototype.

25. A method as claimed in claim 18, wherein the predictor comprises a radial basis function neural network and, for predicting a prototype, the coefficients projections of the image according components analysis are applied to the input of the radial basis function neural network, having a first layer, in which distances between the input and weight vectors calculated based on the set of prototypes are computed, said computed distances being used to compute, by an activation function, outputs of the first layer, and a second layer, having the function of a perceptron applied to the outputs of the first layer, the outputs of the second layer serving to produce a predicted prototype.

26. A method as claimed in claim 24, wherein time delays are inserted in the second layer of the predictor.

27. A method as claimed in claim 18, wherein the predictor has one reliance value output for each prototype of the set of prototypes, and if the prototype with the highest reliance value corresponds to the selected prototype, one indicates an information that the prediction is right.

28. A method of constructing a base of images, comprising the steps of:
subjecting an image to adaptive encoding in an apparatus;
reconstructing the encoded image;
estimating image quality based upon the difference between the encoded image and the image;
determining whether estimated image quality is sufficient;
adding the image to a learning base if quality of the image is sufficient;
subjecting the image to component analysis;
apply components resulting from component analysis to the adaptive encoding;
centering the learning base about zero;
determining component images by independent components analysis; and
keeping a number of significant components.

29. A method as claimed in claim 28, wherein said component analysis for determining component images is principal components analysis.

30. A method as claimed in claim 29, wherein for determining the principal components one searches by calculation eigenvalues and eigenvectors of the covariance matrix of the images of the learning base.

31. A method as claimed in claim 30, wherein the kept components are the eigenvectors associated to the found greatest eigenvalues.

32. A method as claimed in claim 29, wherein the number of the kept principal components being N, said components are the N eigenvectors associated to the N found greatest eigenvalues.

33. A method as claimed in claim 32, wherein if only m<N first principal components are significant, i.e. associated to non zero eigenvalues, the N-m last components are all put to zero.

34. A method as claimed in claim 28, wherein said component analysis for determining component images is independent components analysis.

35. A method as claimed in claim 28, wherein said component analysis for determining component images is principal and independent components analysis.

36. A method as claimed in claim 35, comprising:
establishing a learning base containing images to be transmitted, calculating component images by principal components analysis and independent components analysis and using said images for carrying out a video sequence encoding for transmission thereof.

37. A method as claimed in claims 35, comprising:
establishing a learning base containing images to be received, calculating the component images by principal components analysis and independent components analysis and using said images for carrying out a video sequence encoding for reconstituting during a step of receiving.

38. A method as claimed in claim 28, wherein said components are rendered available for emission and for reception of videotelephony signals.

39. A method as claimed in claim 38, wherein, upon reception, said method further comprises:

calculating a linear combination of components by using as weights the received projection coefficients established upon transmission, associated to the considered components and then establishing the average of the components and displaying the obtained image.

40. A method as claimed in claim 28, wherein, upon emission, said method further comprises:
encoding of an image by centering of the image and calculating the projection coefficients of the image with each of said components, by means of a scalar product.

41. A method as claimed in claim 28, wherein a second vector quantization learning base containing example vectors is created, each example vector being represented by the projection coefficients of each example of the first learning base on the components determined by components analysis, and a set of at least one image prototype is defined based on at least the second learning base.

42. A method as claimed in claim 41, comprising:
encoding an image by selecting the prototype of the set of prototypes having the smallest distance to said image and sending a code of the selected prototype.

43. A method as claimed in claim 42, wherein each prototype is associated with a label forming a code of said prototype.

44. A method as claimed in claim 41, wherein a code of the selected prototype with the relative error between the selected prototype and the image coded according components analysis is sent.

45. A method as claimed in claim 41 wherein a maximum number of prototypes in the set of prototypes and a prototype distance threshold are preset, and the set of prototypes is defined by using a searching algorithm, in which a prototype is defined by a vector in the space of the example vectors of the second learning base, said searching algorithm comprises at least an initialization step, consisting in initializing at least one prototype in view of the example vectors, a searching step, consisting in, when the number of prototypes is smaller than said maximum number of prototypes and when there is at least one of the example vectors, whose distance to any of the prototypes is greater than said prototype distance threshold, dividing at least one of the prototypes, having a distance to each of the example vectors greater than said prototype distance threshold, into two new prototypes according to the direction of greatest variance of said prototype in view of the example vectors, and replacing the original prototype by the two divided new prototypes in the set of prototypes, and a positioning step consisting in moving the new divided prototypes in view of example vectors according to the algorithm of aggregation around mobile centers, the searching step followed by the positioning step being repeated until for each example vector, it exists at least one prototype having a distance to said example vector smaller than said prototype distance threshold, or until the number of prototypes, is equal to said maximum number of prototypes, wherein the prototype distance threshold is a power of two.

46. A method as claimed in claim 45, wherein a code of the predicted prototype with the relative error between the predicted prototype and the image coded according components analysis is sent.

47. A method as claimed in claim 41, wherein at least the last selected prototype is sent to an input of a trainable predictor for predicting a prototype, which is encoded.

48. A method as claimed in claim 47, wherein the predictor comprises a trainable neural network.

49. A method as claimed in claim 48, wherein the trainable neural network comprises a trainable perceptron.

50. A method as claimed in claim 49, wherein time delays are inserted in the perceptron.

51. A method as claimed in claim 49, wherein the predictor comprises, for each of its outputs a sigmoid function applied to a linear combination of its inputs, wherein the multiplication weights of the linear combinations being trained.

52. A method as claimed in claim 47, wherein the predictor comprises a radial basis function neural network and, for predicting a prototype, the coefficients projections of the image according components analysis are applied to the input of the radial basis function neural network, having a first layer, in which distances between the input and weight vectors calculated based on the set of prototypes are computed, said computed distances being used to compute, by an activation function, outputs of the first layer, and a second layer, having the function of a perceptron applied to the outputs of the first layer, the outputs of the second layer serving to produce a predicted prototype.

53. A method as claimed in claim 47, wherein the predictor has one reliance value output for each prototype of the set of prototypes, and if the prototype with the highest reliance value corresponds to the selected prototype, one indicates an information that the prediction is right.

54. A method as claimed in claim 47, wherein the predictor has one reliance value output for each prototype of the set of prototypes, the prototypes are arranged in the order of their reliance values, and if the selected prototype does not correspond to the prototype with the highest reliance value but corresponds to one of the prototypes having the n next highest reliance values, the image is coded as the place of the selected prototype among said n sorted prototypes having the n next highest reliance values, wherein n is smaller than the maximum number of prototypes.

55. A method as claimed in claim 41, wherein the predictor comprises a radial basis function neural network and, for predicting a prototype, the coefficients projections of the image according components analysis are applied to the input of the radial basis function neural network, having a first layer, in which distances between the input and weight vectors calculated based on the set of prototypes are computed, said computed distances being used to compute, by an activation function, outputs of the first layer, and a second layer, having the function of a perceptron applied to the outputs of the first layer, the outputs of the second layer serving to produce a predicted prototype.

56. A method as claimed in claim 55, wherein time delays are inserted in the second layer of the predictor.

* * * * *